United States Patent
Jang et al.

(10) Patent No.: US 10,042,551 B2
(45) Date of Patent: Aug. 7, 2018

(54) MOBILE TERMINAL HAVING A SCREEN WITH A CIRCULAR FORM AND METHOD FOR CONTROLLING THE SAME

(71) Applicant: LG ELECTRONICS INC., Seoul (KR)

(72) Inventors: Hyukjae Jang, Seoul (KR); Boram Kim, Seoul (KR); Dongsu Han, Seoul (KR); Gukchan Lim, Seoul (KR); Yoonwoo Lee, Seoul (KR); Sungho Woo, Seoul (KR); Hongjo Shim, Seoul (KR); Seonghyok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 689 days.

(21) Appl. No.: 14/553,648

(22) Filed: Nov. 25, 2014

(65) Prior Publication Data
US 2015/0160856 A1    Jun. 11, 2015

(30) Foreign Application Priority Data

Dec. 5, 2013    (KR) .................. 10-2013-0150537
Oct. 10, 2014    (KR) .................. 10-2014-0136753

(51) Int. Cl.
  *G06F 3/048*    (2013.01)
  *G06F 3/0488*    (2013.01)
  (Continued)

(52) U.S. Cl.
  CPC ........ *G06F 3/04886* (2013.01); *G06F 3/0236* (2013.01); *G06F 3/0482* (2013.01);
  (Continued)

(58) Field of Classification Search
  CPC .. G06F 3/04886; G06F 3/0236; G06F 3/0482; G06F 3/04842; G06F 3/04883; G06F 2203/04808
  See application file for complete search history.

(56) References Cited

U.S. PATENT DOCUMENTS

2002/0113827 A1*   8/2002   Perlman ................ G06F 3/0236
                                                                715/840
2009/0019401 A1*   1/2009   Park .................... G06F 3/04883
                                                                715/841

(Continued)

OTHER PUBLICATIONS

International Search and Written Opinion for PCT/KR2014/011318 dated Mar. 16, 2015.

*Primary Examiner* — Kieu Vu
*Assistant Examiner* — Asteway T Gattew
(74) *Attorney, Agent, or Firm* — KED & Associates LLP

(57) ABSTRACT

The present invention relates to a mobile terminal and a method of controlling therefor. The mobile terminal includes a touch screen configured to display information on a screen of a circle form and a controller configured to control two or more touch keys to which at least one or more characters different from each other are respectively assigned to be arranged along with a border of the screen and when a first touch input is received on at least one or more keys among the touch keys, the controller configured to control an operation relevant to the at least one or more characters assigned to the at least one or more keys. A user can easily input a character and watch a currently used screen at a glance at the same time in a manner of displaying each of the touch keys of a keypad along with the border of the touch screen of the circle form in a size capable of being easily touched by the user.

17 Claims, 58 Drawing Sheets

(51) Int. Cl.
    *G06F 3/0482*    (2013.01)
    *G06F 3/023*     (2006.01)
    *G06F 3/0484*    (2013.01)

(52) U.S. Cl.
    CPC ...... *G06F 3/04842* (2013.01); *G06F 3/04883*
        (2013.01); *G06F 2203/04808* (2013.01)

(56) References Cited

U.S. PATENT DOCUMENTS

| | | | |
|---|---|---|---|
| 2010/0265172 A1 | 10/2010 | Sadahiro | |
| 2011/0016390 A1* | 1/2011 | Oh | G06F 3/0482 |
| | | | 715/702 |
| 2011/0022393 A1* | 1/2011 | Waller | G01C 21/3608 |
| | | | 704/270 |
| 2011/0071818 A1* | 3/2011 | Jiang | G06F 3/0236 |
| | | | 704/8 |
| 2011/0221685 A1* | 9/2011 | Lee | G06F 3/0482 |
| | | | 345/173 |
| 2013/0019175 A1* | 1/2013 | Kotler | G06F 3/0482 |
| | | | 715/728 |
| 2013/0087593 A1 | 4/2013 | Alvarez | |
| 2015/0040056 A1* | 2/2015 | Cho | G06F 3/018 |
| | | | 715/773 |

\* cited by examiner

FIG. 5
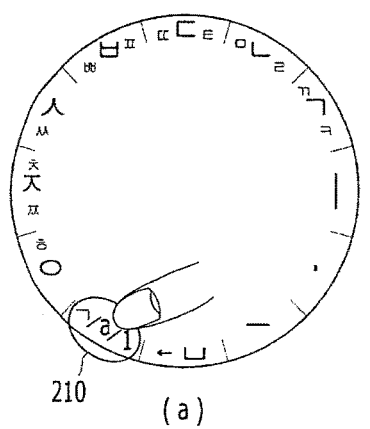  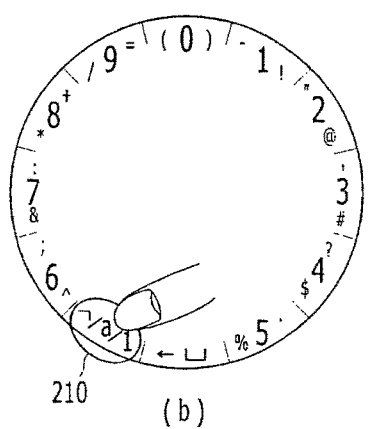
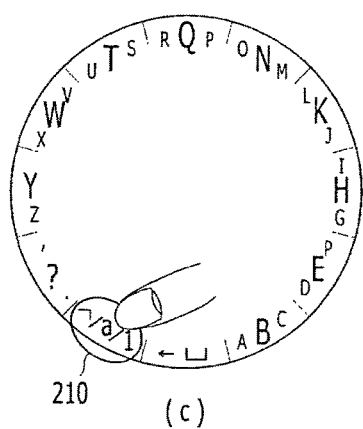

FIG. 6
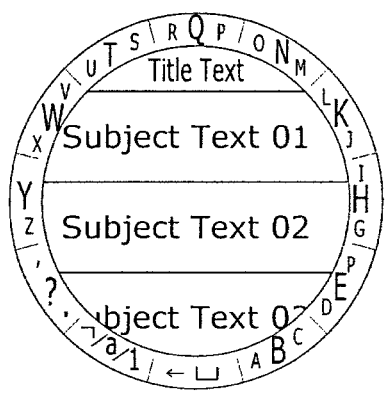
(a)
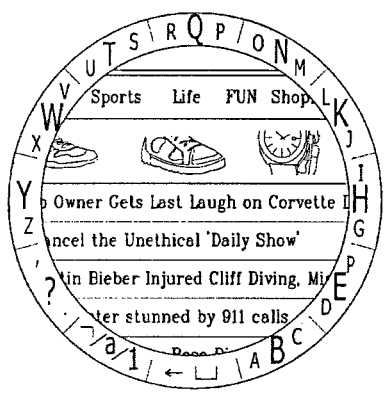
(b)
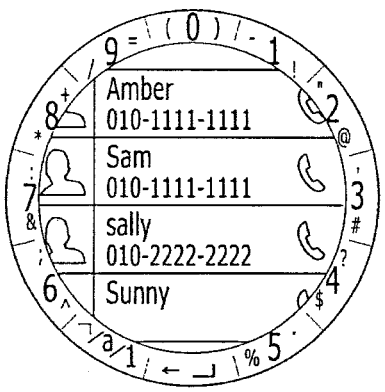
(c)

FIG. 7
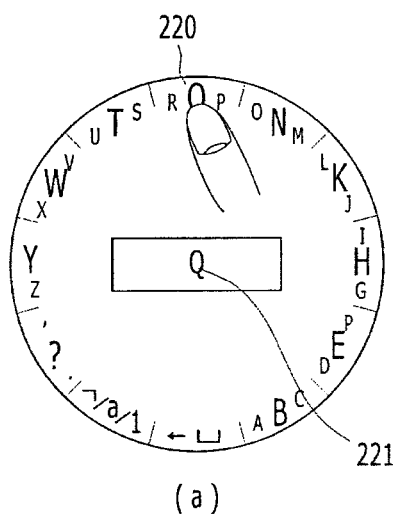
(a)
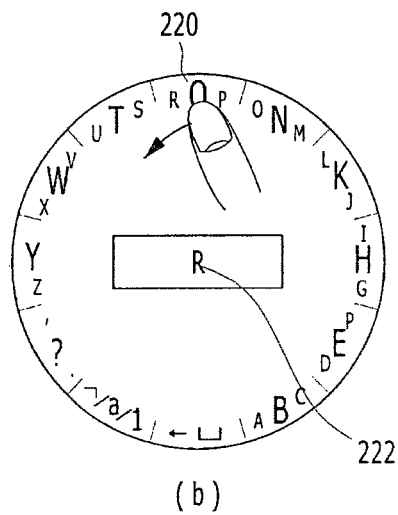
(b)
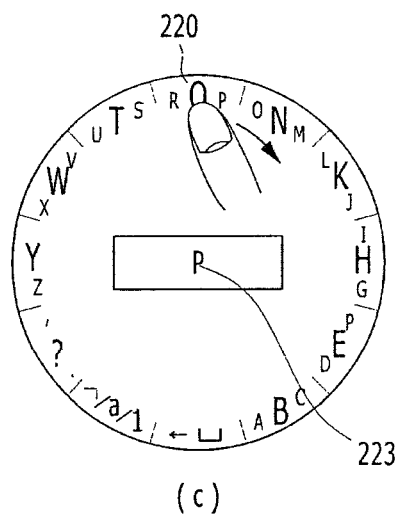
(c)

FIG. 8
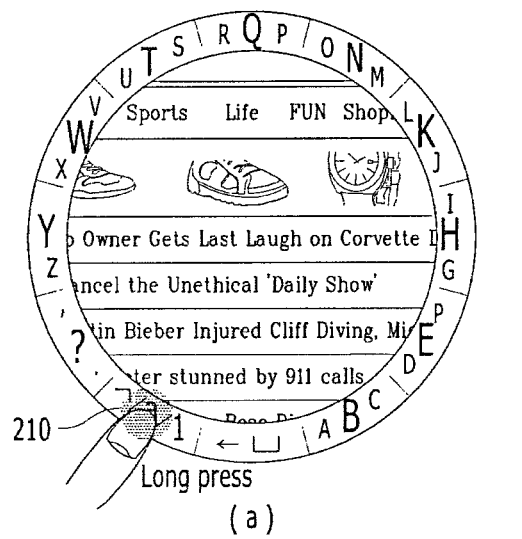
(a)
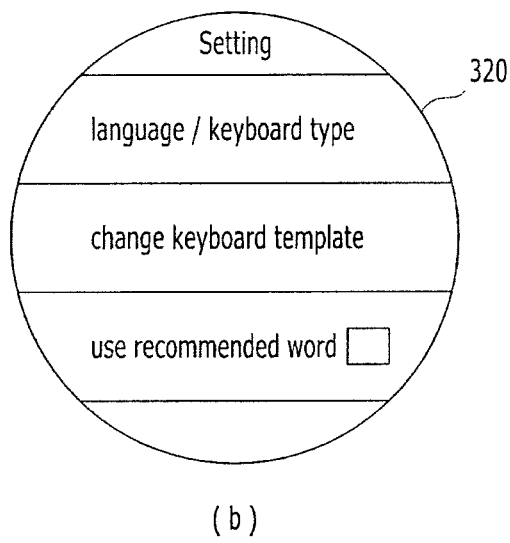
(b)

FIG. 9
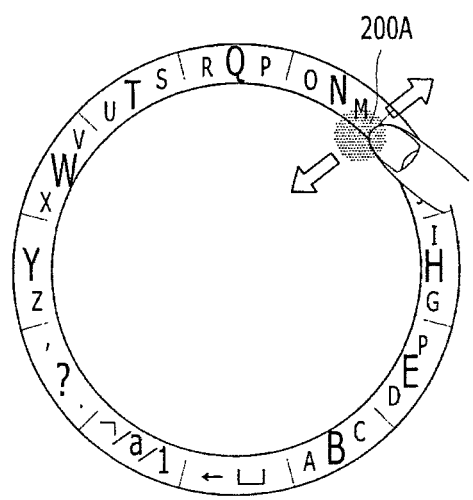
(a)
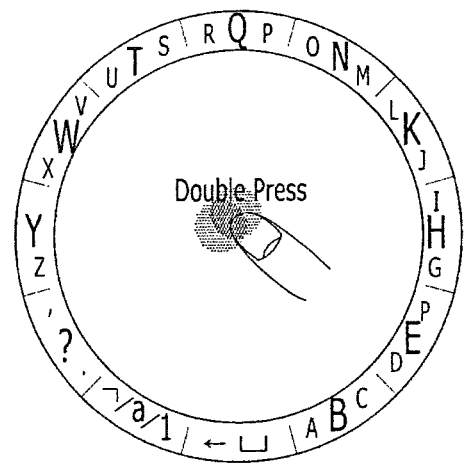
(b)

FIG. 10
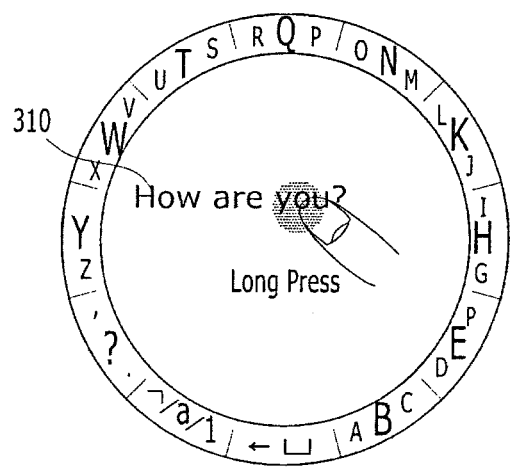
(a)
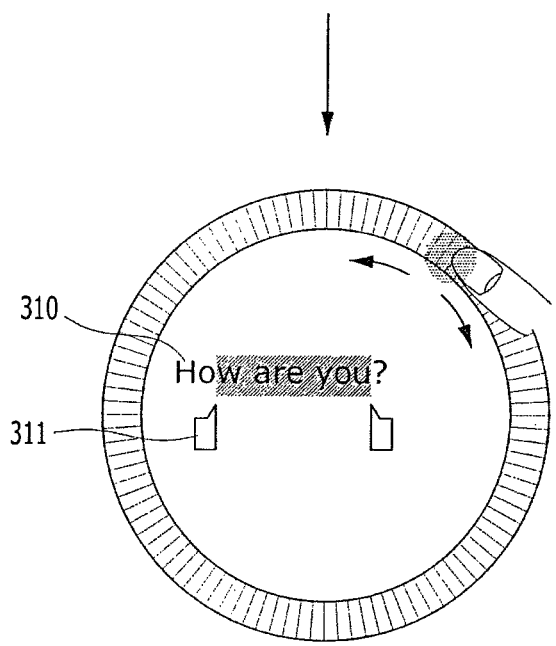
(b)

FIG. 12
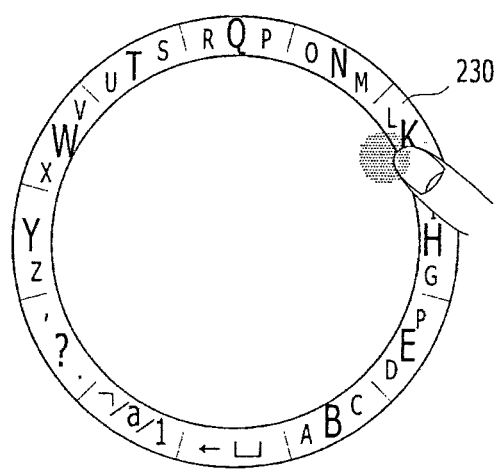
(a)
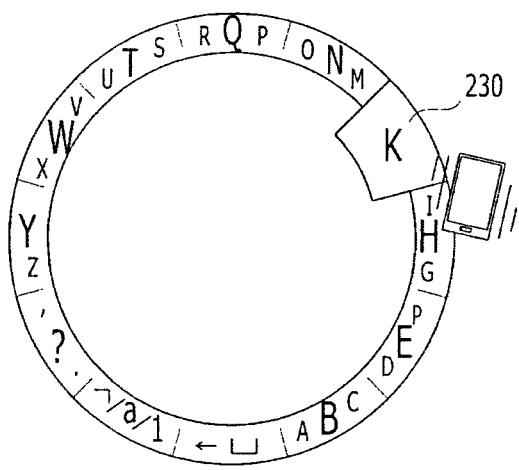
(b)

FIG. 15
(a)
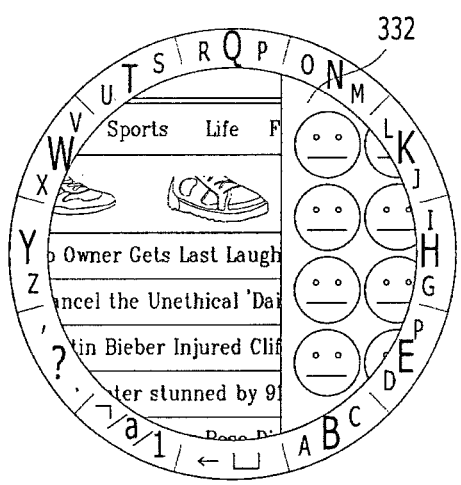
(b)

FIG. 16
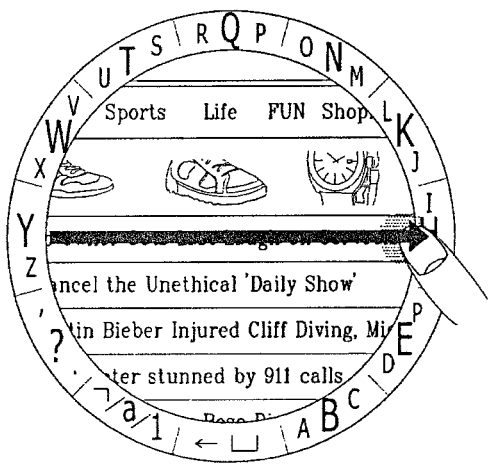
(a)
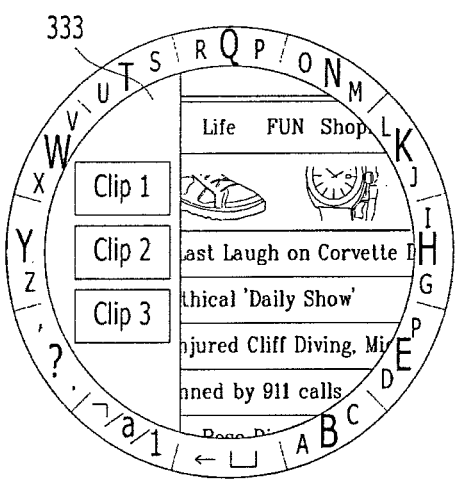
(b)

FIG. 17
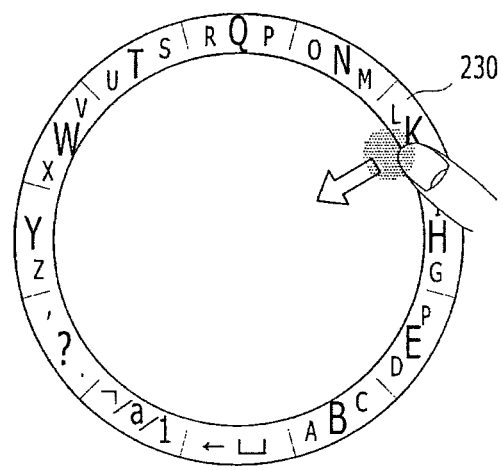
(a)
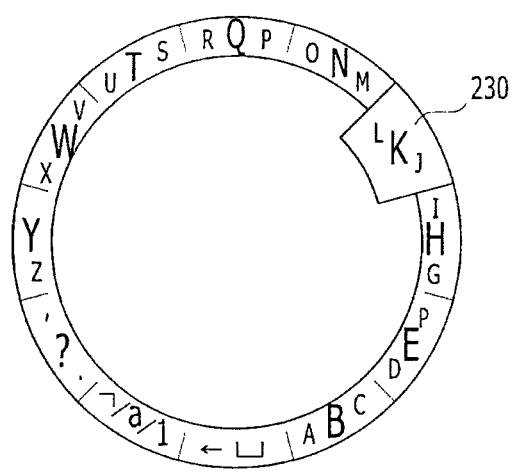
(b)

FIG. 18
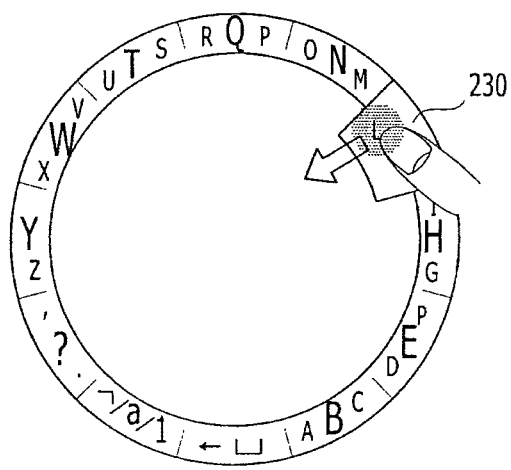
(a)
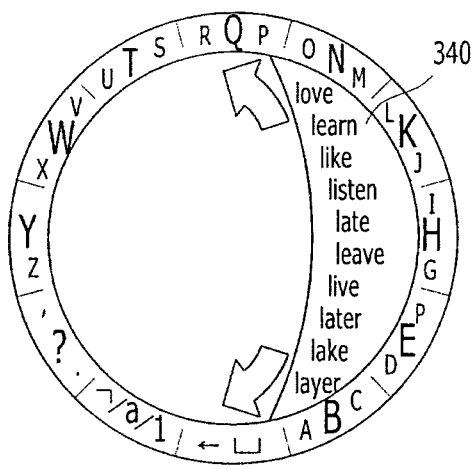
(b)

FIG. 19
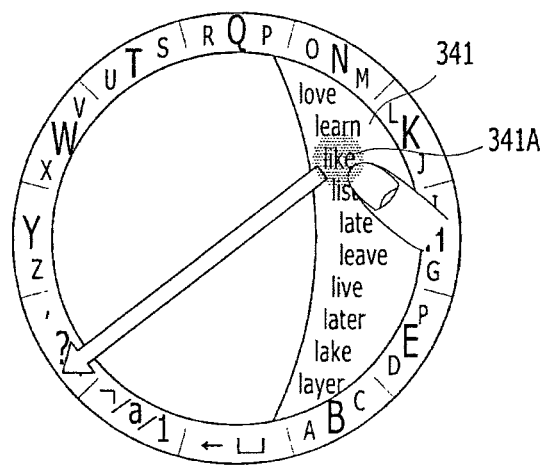
(a)
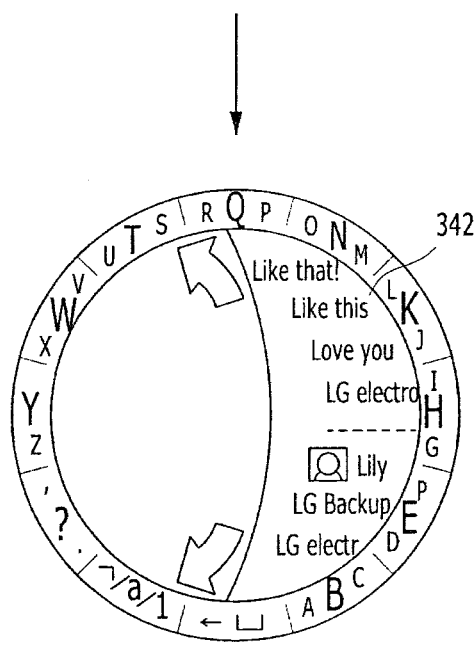
(b)

FIG. 21
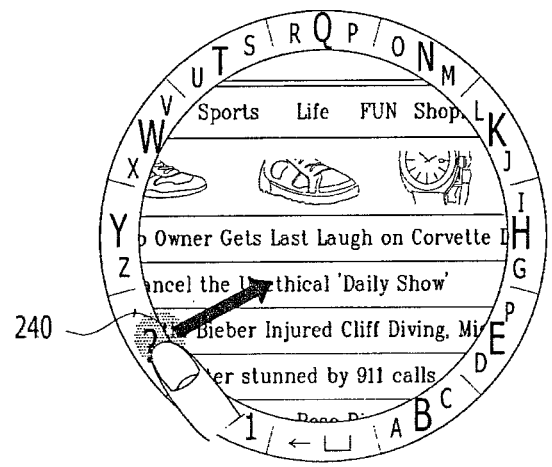
(a)
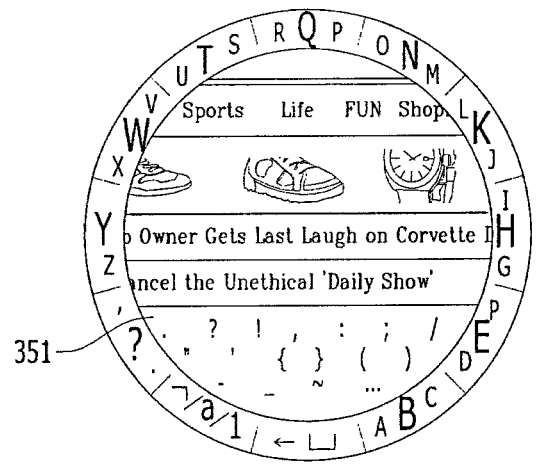
(b)

FIG. 22
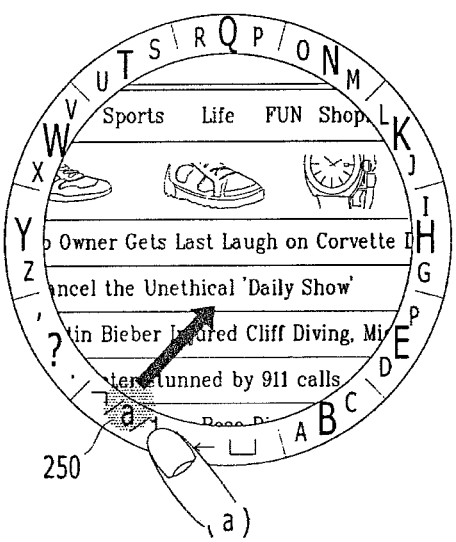
(a)
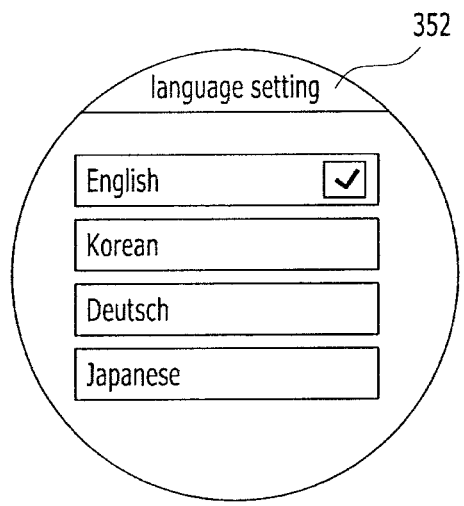
(b)

FIG. 24
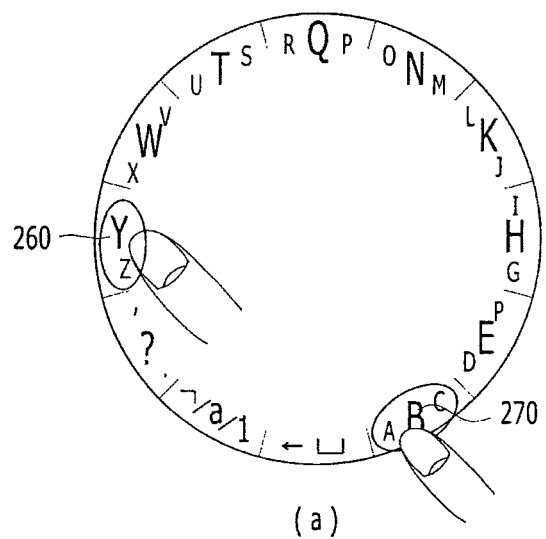
(a)
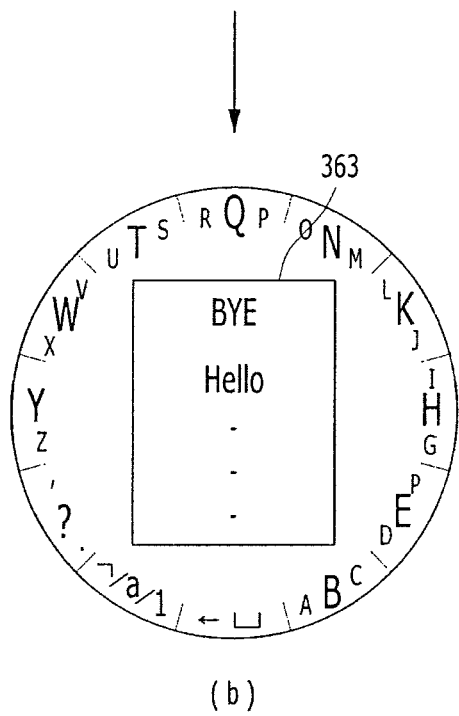
(b)

FIG. 27
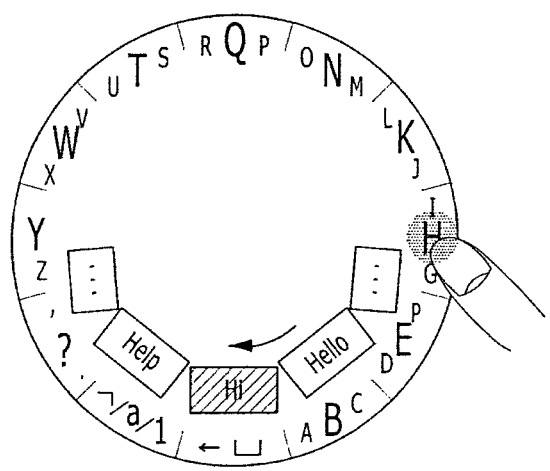
(a)
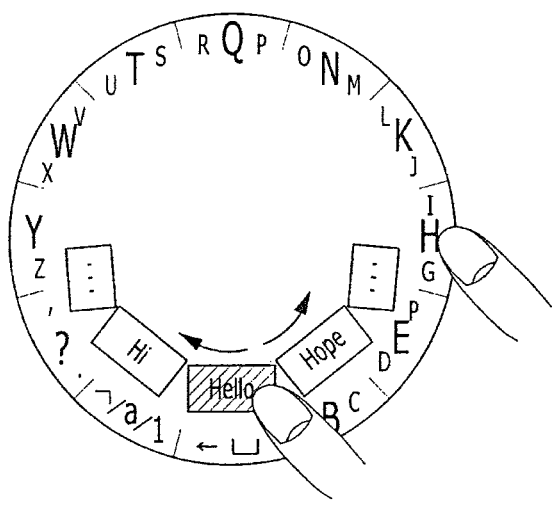
(b)

FIG. 28
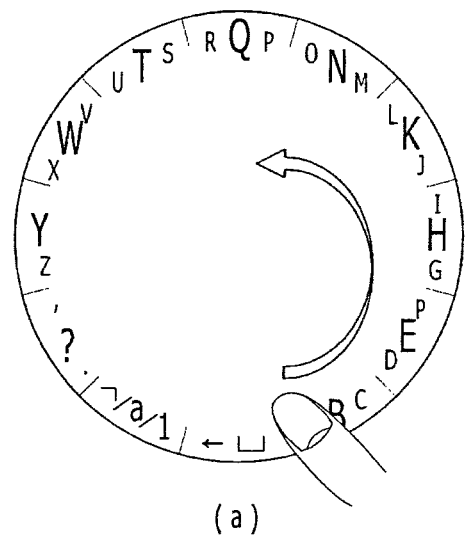
(a)
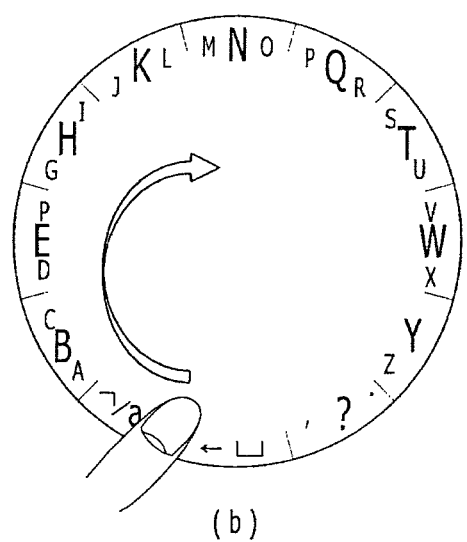
(b)

FIG. 30
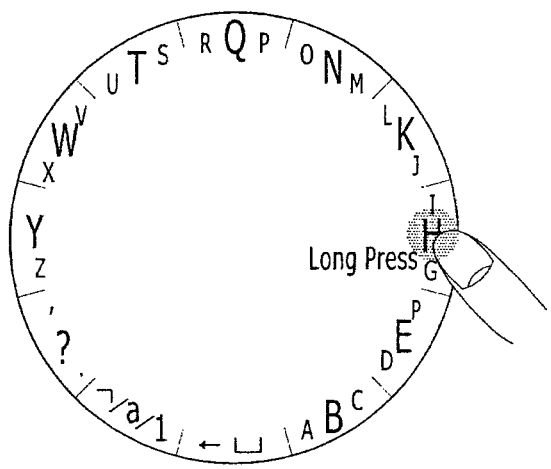
(a)
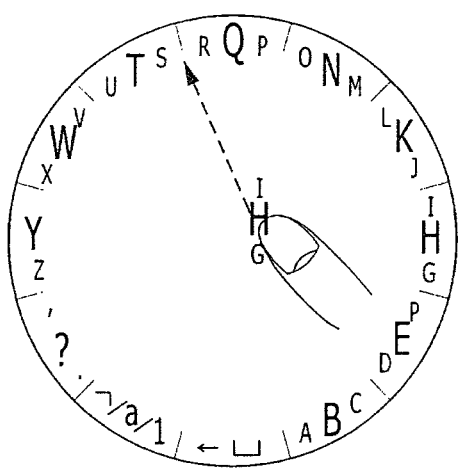
(b)

FIG. 31
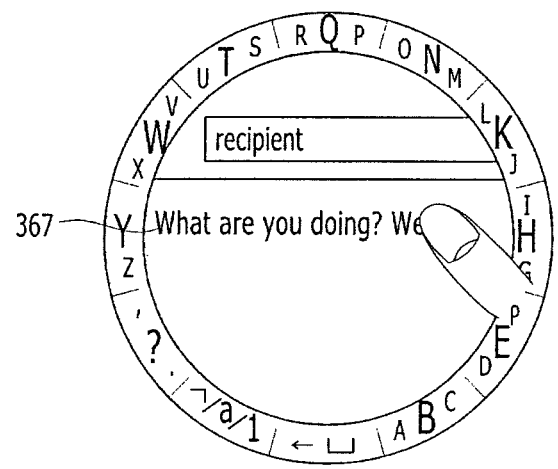
(a)
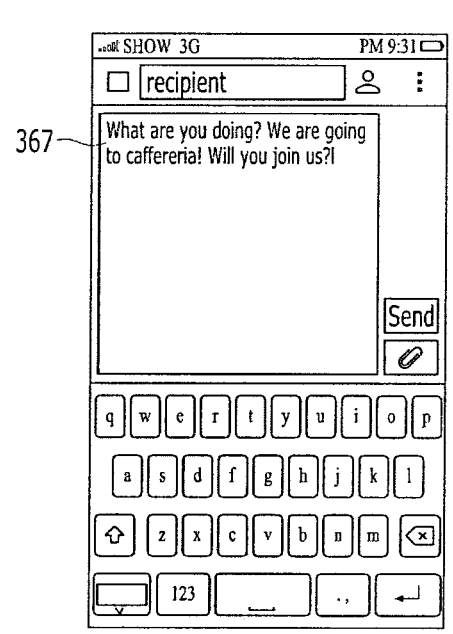
(b)

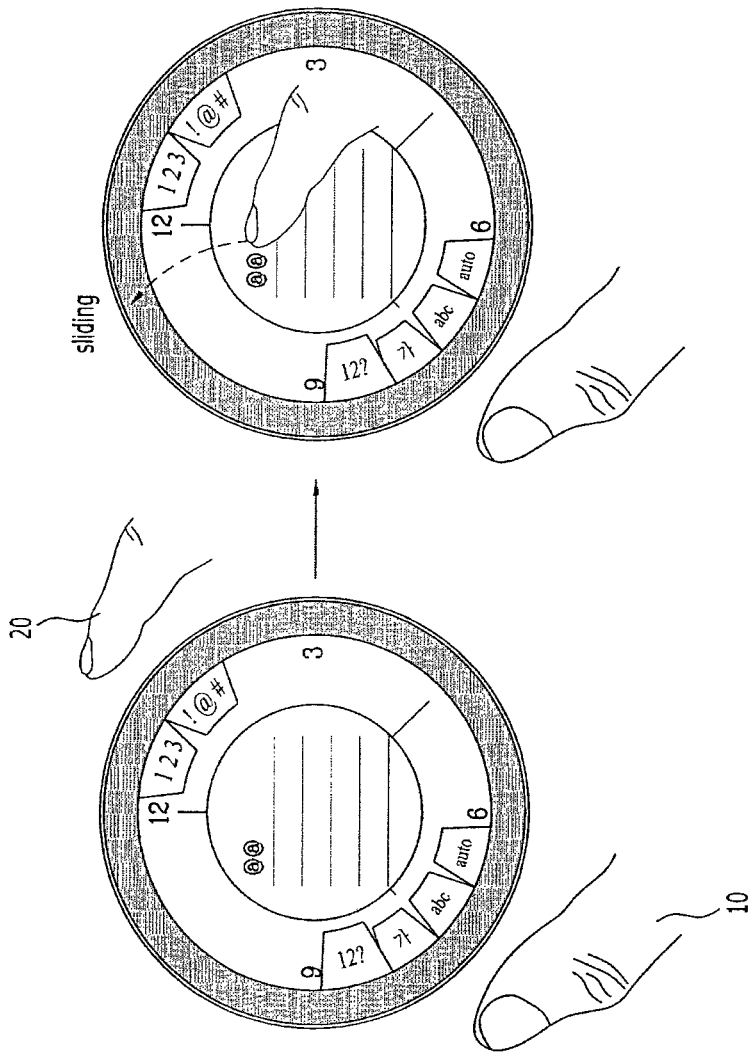

MOBILE TERMINAL HAVING A SCREEN WITH A CIRCULAR FORM AND METHOD FOR CONTROLLING THE SAME

CROSS-REFERENCE TO RELATED APPLICATION(S)

This application claims priority under 35 U.S.C. § 119 to Korean Application No. 10-2013-0150537 filed on Dec. 5, 2013 and to Korean Application No. 10-2014-0136753, filed on Oct. 10, 2014, whose entire disclosures are hereby incorporated by reference.

BACKGROUND

1. Field

The present invention relates to a mobile terminal, and more particularly, to a mobile terminal and a method of controlling the mobile terminal.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Currently, a smartwatch, which corresponds to a wearable device of a watch type providing a function identical to that of a smartphone, is widely used.

In particular, a user can use various services of a smartwatch such as making a call, messaging, alarm, healthcare, stock quotation and the like via the smartwatch in a manner of making the smartwatch interwork with a smartphone of the user.

Yet, since a smartwatch is equipped with a touchscreen of a size as small as a watch, when a user inputs a character via a keypad displayed on the smartwatch, the keypad occupies more than a half of the touch screen. Hence, it is difficult for the user to see a screen in use.

Moreover, since each of touch keys of the keypad has a size not sufficient for a user to easily touch, it is inconvenient for the user to actually touch the touch keys. And, since a space on which a character inputted via the keypad is displayed is narrow, it is inconvenient for a user to see a sentence inputted by the user at a glance.

SUMMARY OF THE INVENTION

Accordingly, an object of the present invention is to address the above-noted and other problems.

The present invention is directed to an apparatus and method thereof that substantially obviate one or more problems due to limitations and disadvantages of the related art.

An object of the present invention is to provide a mobile terminal configured to arrange and display each of touch keys of a keypad in accordance with a screen of a touch screen of a circle form in a size capable of being easily touched by a user and control operation of displaying a character assigned to a corresponding touch key according to a touch input touched by the user and a method controlling therefor.

To achieve these objects and other advantages and in accordance with the purpose of the invention, as embodied and broadly described herein, a mobile terminal includes a touch screen configured to display information on a screen of a circle form and a controller configured to control two or more touch keys to which at least one or more characters different from each other are respectively assigned to be arranged and displayed along with a border of the screen, and when a first touch input is received on at least one or more keys among the touch keys, the controller configured to control an operation relevant to at least one or more characters assigned to the at least one or more keys.

To further achieve these objects and other advantages and in accordance with the purpose of the invention, as embodied and broadly described herein, a method of controlling a mobile terminal according to the present invention includes the steps of displaying two or more touch keys to which at least one or more characters different from each other are respectively assigned in a manner of arranging the two or more touch keys along with a border of a screen containing a circle form, receiving a first touch input touching at least one or more keys among the touch keys and controlling an operation relevant to at least one or more characters assigned to the at least one or more keys.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIGS. 5 to 49 are diagrams for a method of controlling a mobile terminal of a smartwatch type according to the present invention.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
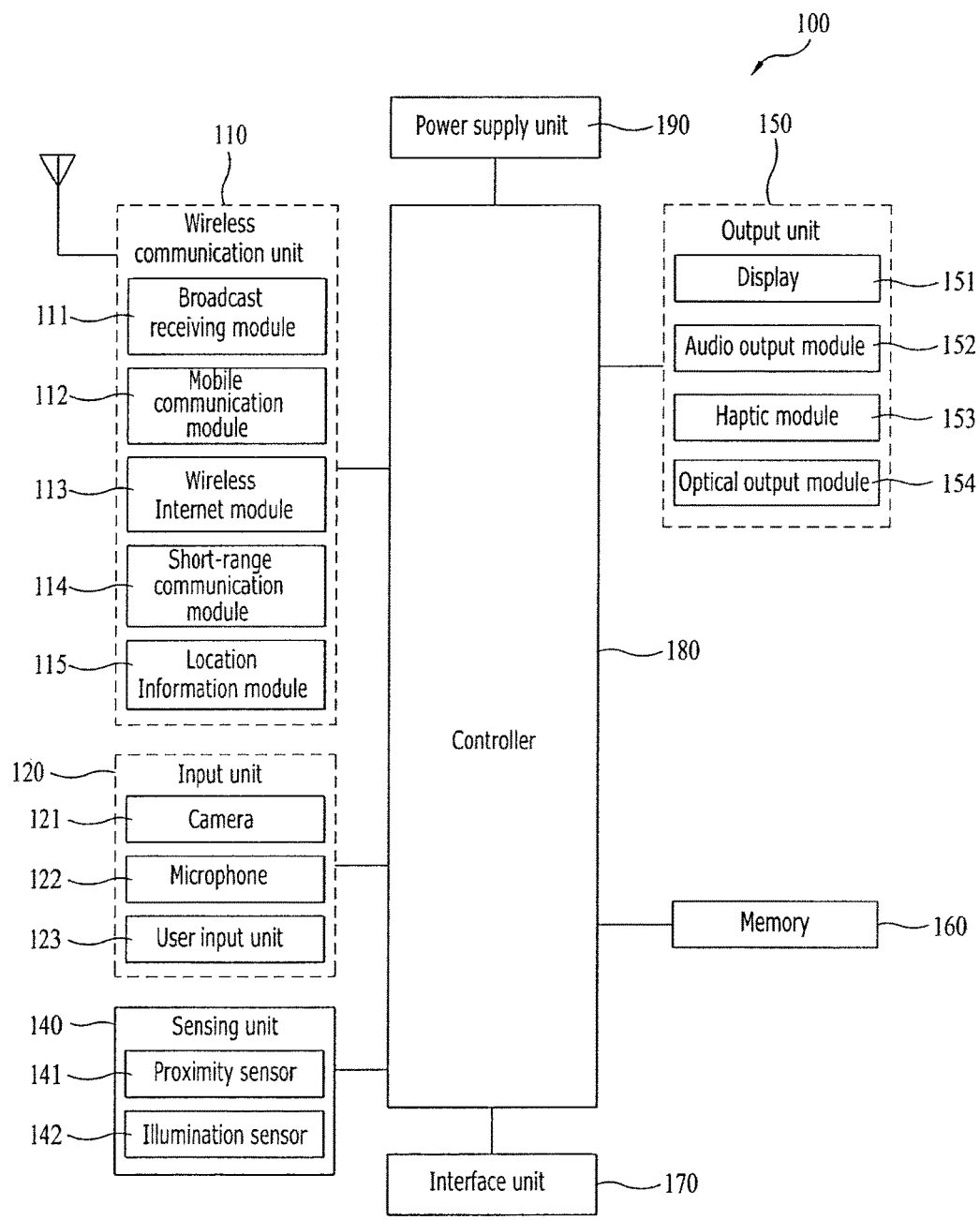
FIG. 1 is a block diagram for explaining a mobile terminal related to the present invention.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Meanwhile, a mobile terminal described in the following may correspond to a mobile terminal of a watch type capable of being worn on a wrist of a user. In explaining embodiments described in the following, assume that a mobile terminal according to the present invention includes a part or all of components shown in FIG. 1.

Figure 2:
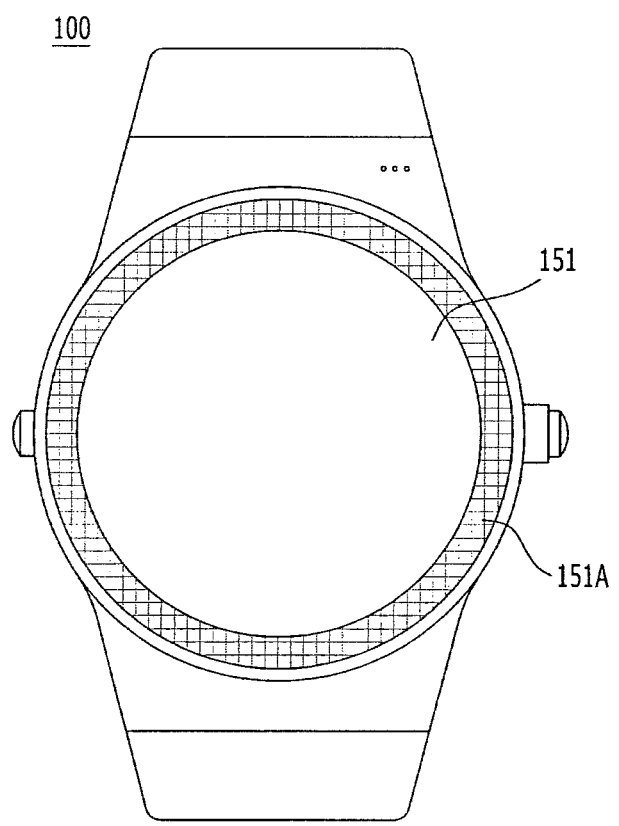
FIG. 2 is a front side perspective diagram for a mobile terminal of a smartwatch type according to one embodiment of the present invention.

FIG. 2 is a front side perspective diagram for a mobile terminal of a smartwatch type according to one embodiment of the present invention.

As shown in FIG. 2, a mobile terminal 100 may correspond to a smartwatch designed by a watch type. The mobile terminal 100 may include a touch input unit 420 positioned at a bezel encasing a touch screen 410.

Figure 3:
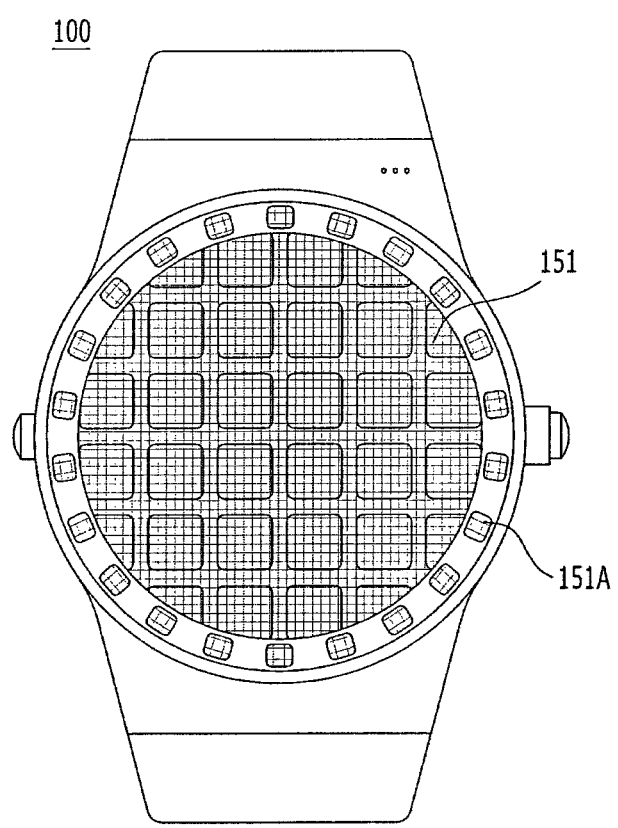
FIG. 3 is a diagram for explaining a touch sensor arrangement of a mobile terminal of a smartwatch type according to one embodiment of the present invention.

FIG. 3 is a diagram for explaining a touch sensor arrangement of a mobile terminal of a smartwatch type according to one embodiment of the present invention.

Referring to FIG. 3, touch sensors can be arranged to a touch screen 151 and a touch input unit 151A, respectively. The touch sensors respectively arranged to the touch screen and the touch input unit distinguish a user input received on the touch screen 151 from a user input received on the touch input unit 151A and may be then able to deliver the user inputs to a controller 180.

In the following description, a method of controlling a mobile terminal according to one embodiment of the present invention is explained with reference to FIG. 4 to FIG. 49.

Figure 4:
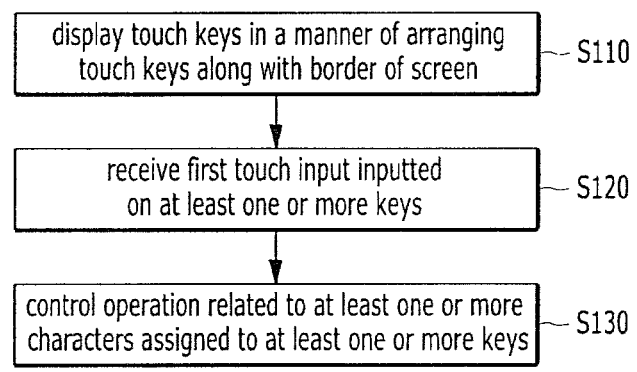
FIG. 4 is a flowchart for a process of controlling a mobile terminal of a smartwatch type according to the present invention.

FIG. 4 is a flowchart for a process of controlling a mobile terminal of a smartwatch type according to one embodiment of the present invention.

FIGS. 5 to 49 are diagrams for explaining a process of controlling a mobile terminal of a smartwatch type according to the present invention.

Referring to FIG. 4 to FIG. 49, if a screen of a touch screen 151 of a circle form is enlarged, a controller 180 displays two or more touch keys included in an IME (input method editor) in a manner of respectively arranging the two or more touch keys to a border of the screen of the circle form [S110]. If a first touch input is received on at least one or more touch keys [S120], the controller controls an operation related to at least one or more characters assigned to the at least one or more touch keys [S130].

In this case, two or more characters including languages of at least one or more countries, alphabet, number, a special character and the like are assigned to the touch keys, respectively. As shown in FIG. 5, similar to 12 hours written on a watch, the touch keys are displayed on the inside of the border of the screen of the circle form in a manner of being arranged to positions corresponding to 12 hours, respectively.

In this case, since all characters belonging to a specific character mode (a vernacular mode, an English mode, a number mode and a special character mode) are unable to be arranged to the 12 positions corresponding to 12 hours in the inside of the border of the screen, as shown in FIG. 5, 12 touch keys are arranged to the 12 positions, respectively. And, 12 representative characters are assigned to each of the 12 touch keys, respectively. And, two or more characters including an order adjacent to each of the 12 representative characters or two or more characters relevant to each of the 12 representative characters can be assigned to the each of the touch keys.

As an example, FIG. 5(*a*) indicates an IME of a Korean mode. Korean touch keys are respectively arranged to 12 positions corresponding to 12 hours in the inside of the border of the screen, a statistically frequent used consonant and a statistically frequent used vowel are assigned to each of the Korean touch keys, respectively, as a representative character. The rest of the keys are assigned together with at least one or more representative characters.

In this case, a character mode switching touch key 210 is included in the IME. As shown in FIGS. 5(*b*) and (*c*), whenever the character mode switching touch key 210 is selected, the controller 80 displays a number mode IME and an English mode IME in a manner of switching the Korean mode IME in sequence.

Subsequently, as shown in FIG. 6, when the controller 180 displays the IME in the inside of the border of the screen in a state that a specific content is displayed on the screen of the circle form, the controller is able to enable a user to input a preferred character via the IME in a state that the screen is minimally blocked. If a result of the screen changes according to the inputted character, the user can input a character while looking at the screen.

In this case, in order to make the IME minimally block the screen, the controller 180 can display the IME on the border of the screen in a manner of making the IME to be translucent. Or, the controller may usually hide the IME from the screen and may display the IME only when the border of the screen is touched.

As shown in FIG. 6(a), a list including specific items is displayed on the screen. If a specific touch key of the IME displayed on the border of the screen is selected, the specific items included in the list can change to items including a character assigned to the selected touch key and the items can be displayed on the screen instead of the specific items.

Subsequently, as shown in FIG. 6(b), a web page providing a specific search window is displayed on the screen. If a specific touch key of the IME displayed on the border of the screen is selected, the controller 180 inputs a character assigned to the selected touch key in the search window as a search word and may be able to display a web page to which a search result according to the search word is reflected on the screen.

Subsequently, as shown in FIG. 6(c), if a phone book is displayed on the screen and a specific touch key of the IME displayed on the border of the screen is selected, the controller 180 searches for contacts including a character assigned to the selected touch key in the phone book and can display the contacts on the screen.

FIG. 7 is a diagram for an example of a method of inputting a character using the IME.

In particular, as shown in FIG. 7(a), if a first touch key 220 is touched in the IME of a specific character input mode and the touch is released from a position of the first touch key 220, the controller 180 automatically puts a representative character ("Q") 221 assigned to the first touch key 220 in a character input window.

In this case, the controller 180 may display the representative character ("Q") 221 assigned to the first touch key 220 only on the first touch key 220 before the first touch key 220 is released after being touched.

Meanwhile, if the first touch key 220 is touched, dragged and released on a position of a second touch key, the controller 180 can automatically put a representative character assigned to the second touch key.

Subsequently, as shown in FIG. 7(b), if the first touch key 220 is touched, dragged in a first direction (left direction) and released, the controller 180 can automatically put a character ("R") 222, which is assigned to the first touch key 220 together with the representative character ("Q") and displayed in the first direction on the basis of the representative character ("Q"), in the character input window.

In this case, the controller 180 may display the character ("R") 222 assigned to the first touch key 220 only on the first touch key 220 before the first touch key 220 is released after being touched and dragged in the first direction.

Subsequently, as shown in FIG. 7(c), if the first touch key 220 is touched, dragged in a second direction (right direction) opposite to the first direction and released, the controller 180 can automatically put a character ("P") 223, which is assigned to the first touch key 220 together with the representative character ("Q") and displayed in the second direction on the basis of the representative character ("Q"), in the character input window.

In this case, the controller 180 may display the character ("P") 223 assigned to the first touch key 220 only on the first touch key 220 before the first touch key 220 is released after being touched and dragged in the second direction.

Subsequently, as shown in FIG. 8, if a predetermined touch key of the IME is touched by a predetermined scheme, the controller 180 can provide a user with a setting menu of the IME.

As an example, as shown in FIG. 8(a), if a character mode switching touch key 210 among touch keys of the IME is long touched, as shown in FIG. 8(b), the controller 180 displays a setting menu 320 of the IME.

As an example, the setting menu 320 may include a first menu used for setting a language type of the IME, a second menu used for changing a template of the IME and a third menu used for setting whether to use a recommended word.

And, the setting menu 320 may further include a fourth menu used for controlling a width of the IME positioned at the border of the screen.

In particular, as shown in FIG. 9(a), if the fourth menu is selected, the controller 180 activates a mode controlling a width of the IME and a user can control the width of the IME by dragging a border line 200A of the IME in the width controlling mode.

In particular, if the border line 200A is dragged toward the center of the screen of the circle form, the controller 180 widens the width of the IME. If the border line 200A is dragged toward the outside of the screen of the circle form, the controller narrows the width of the IME.

In this case, the controller 180 increases a font size of characters assigned to the touch keys in proportion to the extent of widening the width of the IME. And, the controller can reduce the font size of the characters assigned to the touch keys in proportion to the extent of narrowing the width of the IME.

As shown in FIG. 9(b), when controlling the width of the IME is completed, if a touch gesture of a predetermined scheme is inputted on the screen, the controller 180 deactivates the mode of controlling the width of the IME. As an example, the touch gesture may correspond to a double touch continuously touching a specific point of the screen twice.

As shown in FIG. 10, when the IME and a specific text sentence are displayed on the screen, the controller 180 can gradually and automatically select characters belonging to the text sentence in response to a touch wheel operation of the IME.

In particular, according to a related art, in order for a user to edit (copy, cut, share and the like) a preferred part in a text sentence, the user should drag and designate the preferred part in the text sentence. Yet, it is not easy to designate a preferred part one by one by touching and dragging the preferred part in a small screen such as a smartwatch.

Hence, according to the present invention, the IME displayed on the border of the screen of the circle form is used as a touch wheel to designate a preferred part in the text sentence.

As an example, as shown in FIG. 10(a), if a specific point of a text sentence displayed on the screen is long touched, the controller 180 activates a touch wheel operation mode of the IME. As shown in FIG. 10(b), if a drag touch in a clockwise direction or a drag touch in a counterclockwise direction is inputted on the IME, characters belonging to the text sentence can be gradually and automatically designated in response to a drag distance of the drag touch.

As an example, a long touched part of the text sentence becomes a start point to be designated by a user. As the drag touch is gradually progressing from the start point, the controller 180 automatically and gradually designates characters one by one.

Figure 11:
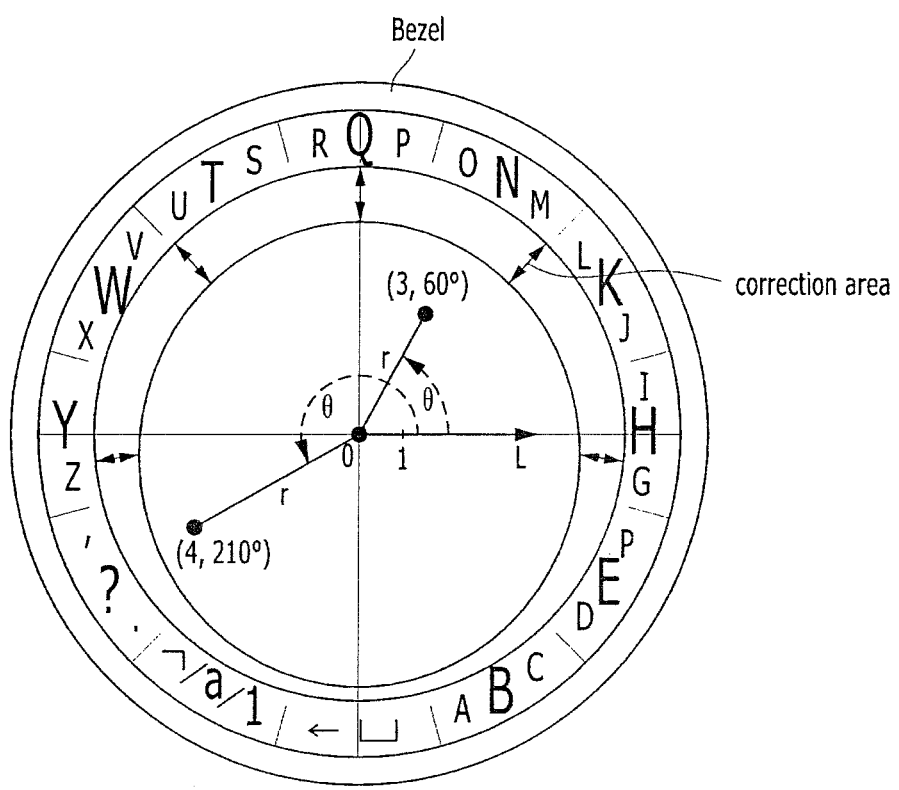

FIG. 11 is a diagram for a touch key recognition process and a touch key error correction process using a polar coordinate system.

Referring to FIG. 11, a touch coordinate is converted into a polar coordinate using a Formula such as 'y=r sin θ' and 'x=r cos θ' on the basis of a center point and a touch key touched by a user is recognized according to r and θ.

As an example, in case of recognizing a touch key to which an N character is assigned in the IME, r is greater than an internal radius of an area at which the touch key to which the N character is assigned is positioned and θ is greater than 150 and less than 450.

In case of such an exterior of a rounded watch as a smartwatch according to the present invention, it is not easy to touch an upper part of the exterior due to a bezel.

This is because, when a user touches a touch key situating at a bottom part, the user is able to easily touch the touch key by erecting a finger. Yet, when the user touches a touch key positioned at a part upper than a center, it is difficult for the user to precisely touch the touch key because a finger face is firstly touched on the touch keys.

Consequently, since it is highly probable to have a touch error in a top part of the screen, according to the present invention, a touch coordinate is converted into a polar coordinate on the basis of a center point of the screen and an r value for a specific touch key touched in the IME is corrected to a bigger value. In particular, a correction area is enlarged as a touched part is going up to an upper part of the screen.

Subsequently, as shown in FIG. 12(a), although a part slightly deviated from a part at which a specific touch key of the IME is positioned is touched, the controller 180 recognizes it as the touch key is actually touched in a manner of considering that an edge is not completely touched due to an ornament of a fringe of a smartwatch. As shown in FIG. 12(b), the controller displays a touch recognition area of the touch key in a manner of enlarging the touch recognition area. Moreover, if the touch key is touched, the controller 180 generates a vibration effect to inform a user of a successful touch touched on the touch key via a haptic module 153.

Figure 13:
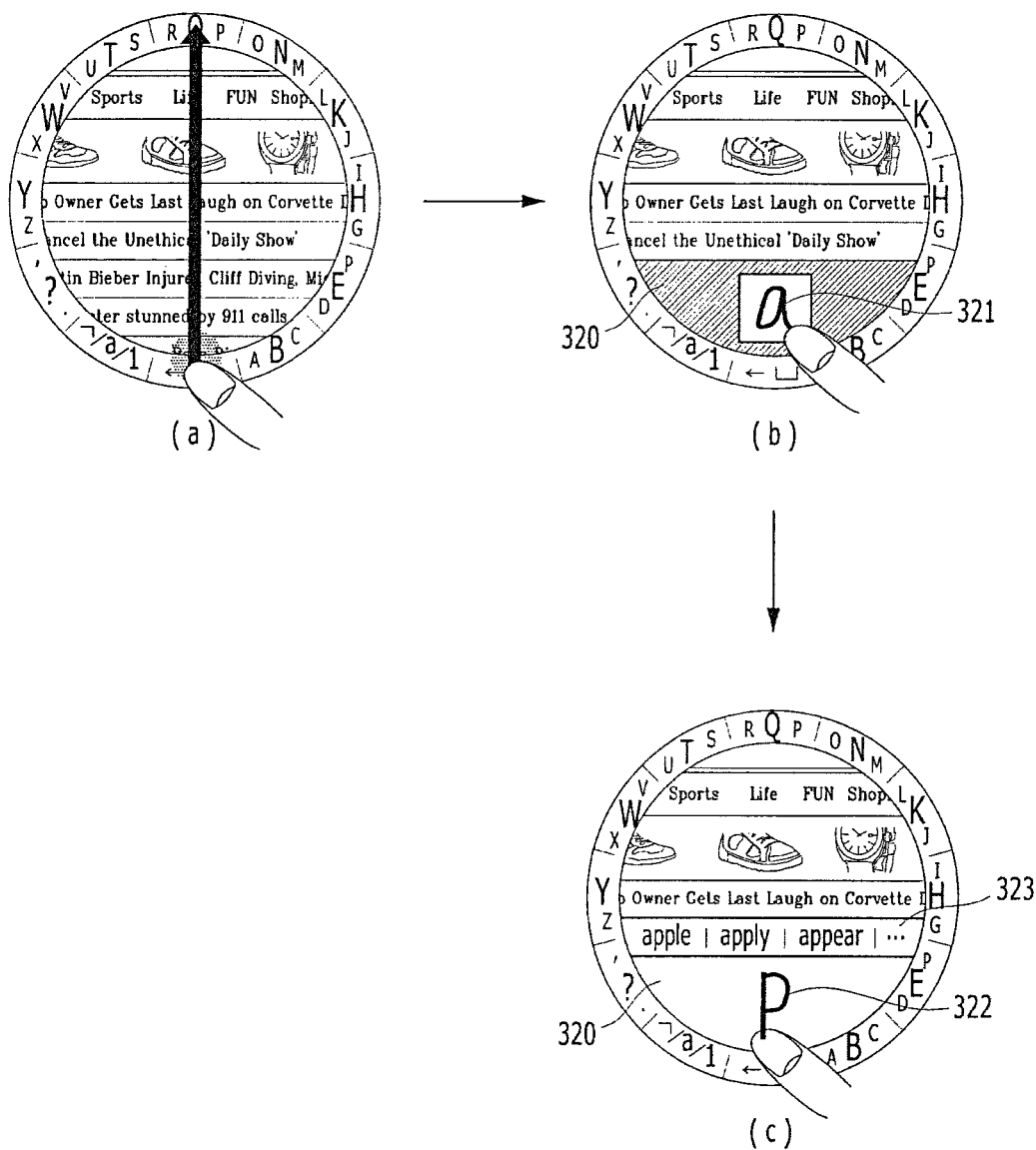

Subsequently, as shown in FIG. 13, if a first side on which the IME is displayed is touched and dragged to an opposite second side on which the IME is displayed in the screen, the controller 180 displays a handwriting input area 320 in the screen and can provide the handwriting input area to a user.

As an example, as shown in FIG. 13(a), if a first touch key of the IME, which is positioned at the bottom of the screen including a search window, is touched and dragged to a second touch key of the IME, which is positioned at the top of the screen, as shown in FIG. 13(b), the controller 180 displays the handwriting input area 320 using a visual effect such as the handwriting input area 320 ascending from the bottom part of the screen to a top direction.

If a handwriting character 321 of a user is inputted via the handwriting input area 320, the controller 180 can automatically put the inputted handwriting character 321 in the search window.

And, as shown in FIG. 13(c), if a handwriting character of a user is inputted via the handwriting input area 320, the controller 180 displays a list 323 of at least one or more recommended words including the handwriting character or recommended sentences and can automatically put a recommended word or a recommended sentence selected from the list 323 in the search window.

In this case, the recommended word or the recommended sentence may include a word or a sentence including the handwriting character for a predetermined time and a word or a sentence frequently used or a word or a sentence predetermined by a user and including the handwriting character.

Meanwhile, if an upper border line of the handwriting input area 320 is touched and dragged to a bottom direction of the screen, the controller 180 can make the handwriting area 320 disappear from the screen using a visual effect such as the handwriting input area 320 descending to the bottom direction of the screen.

Figure 14:
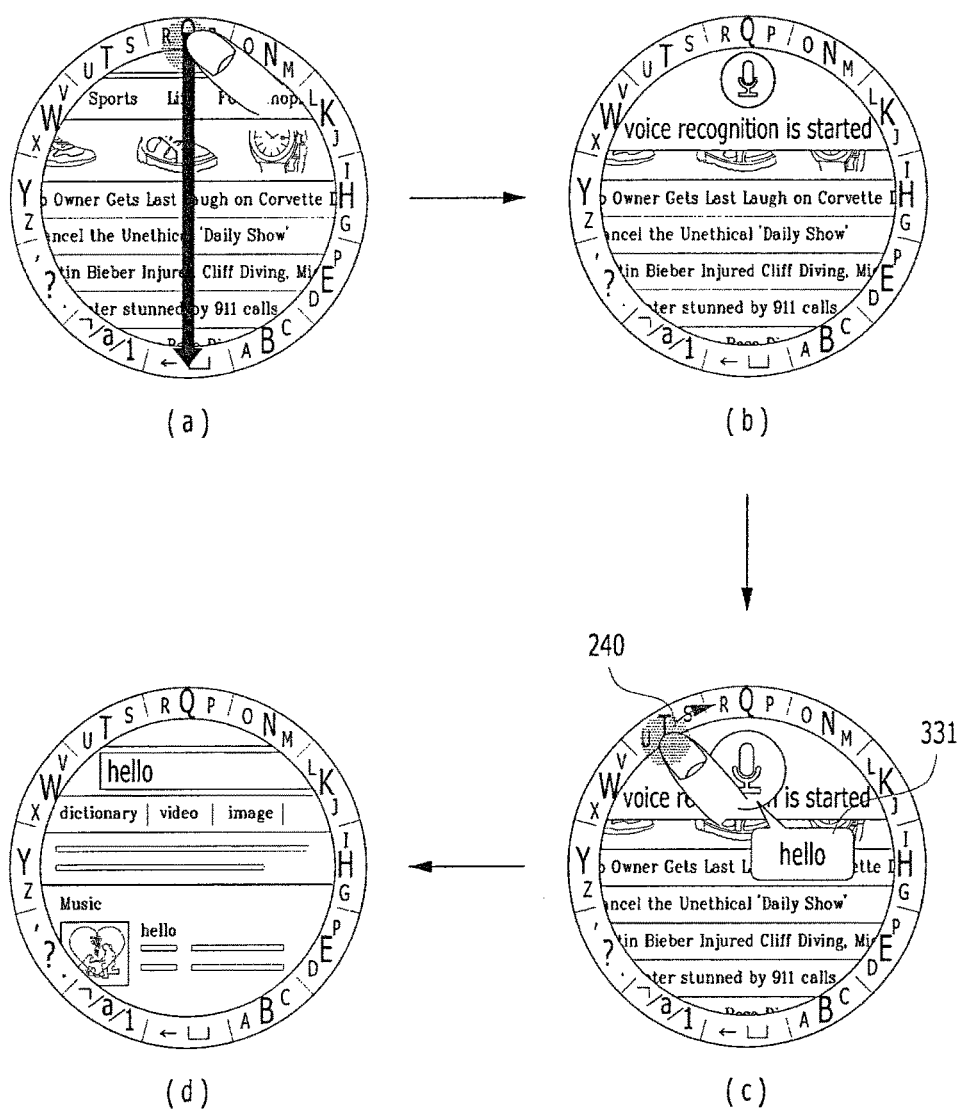
Figure 20:
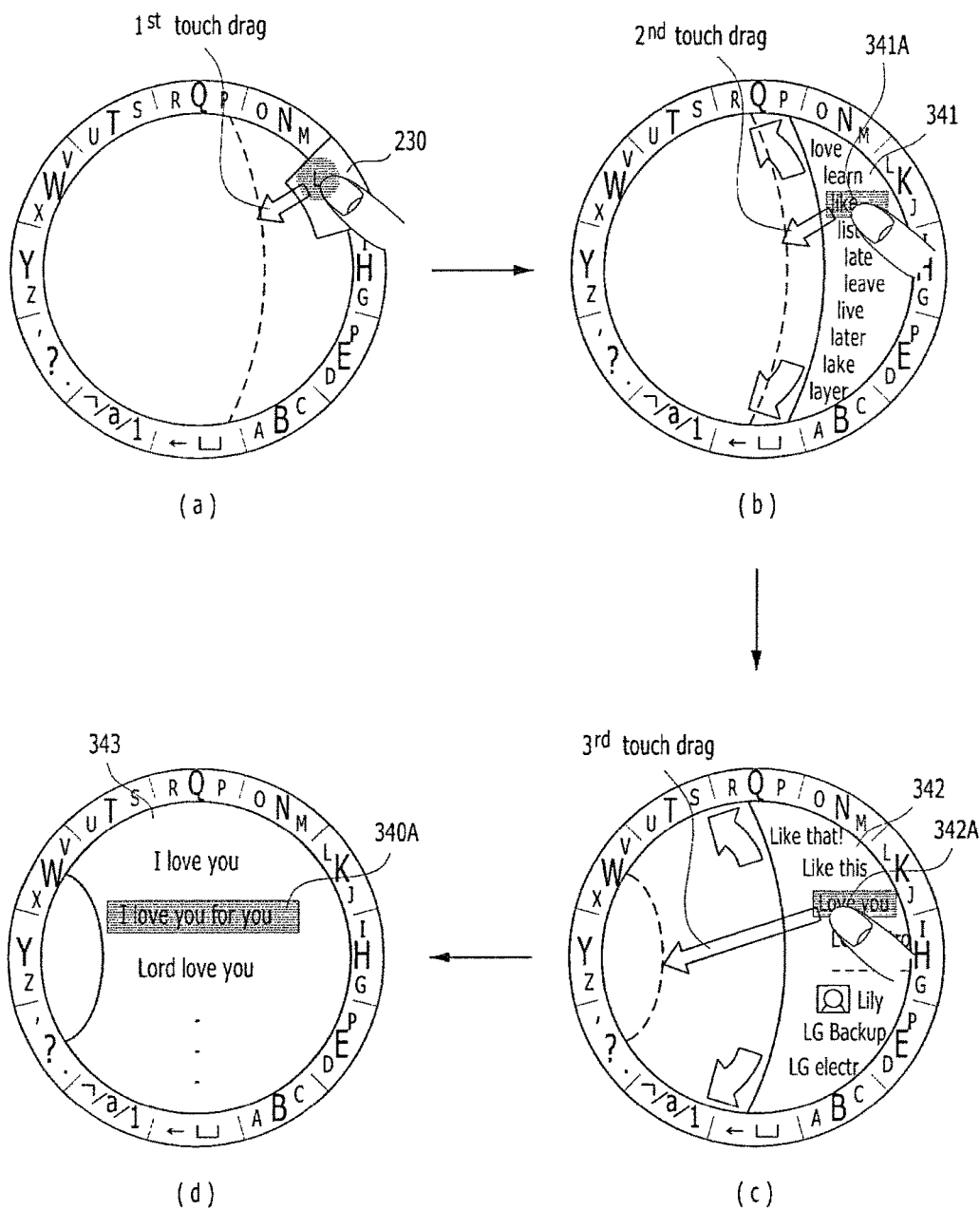
Figure 23:
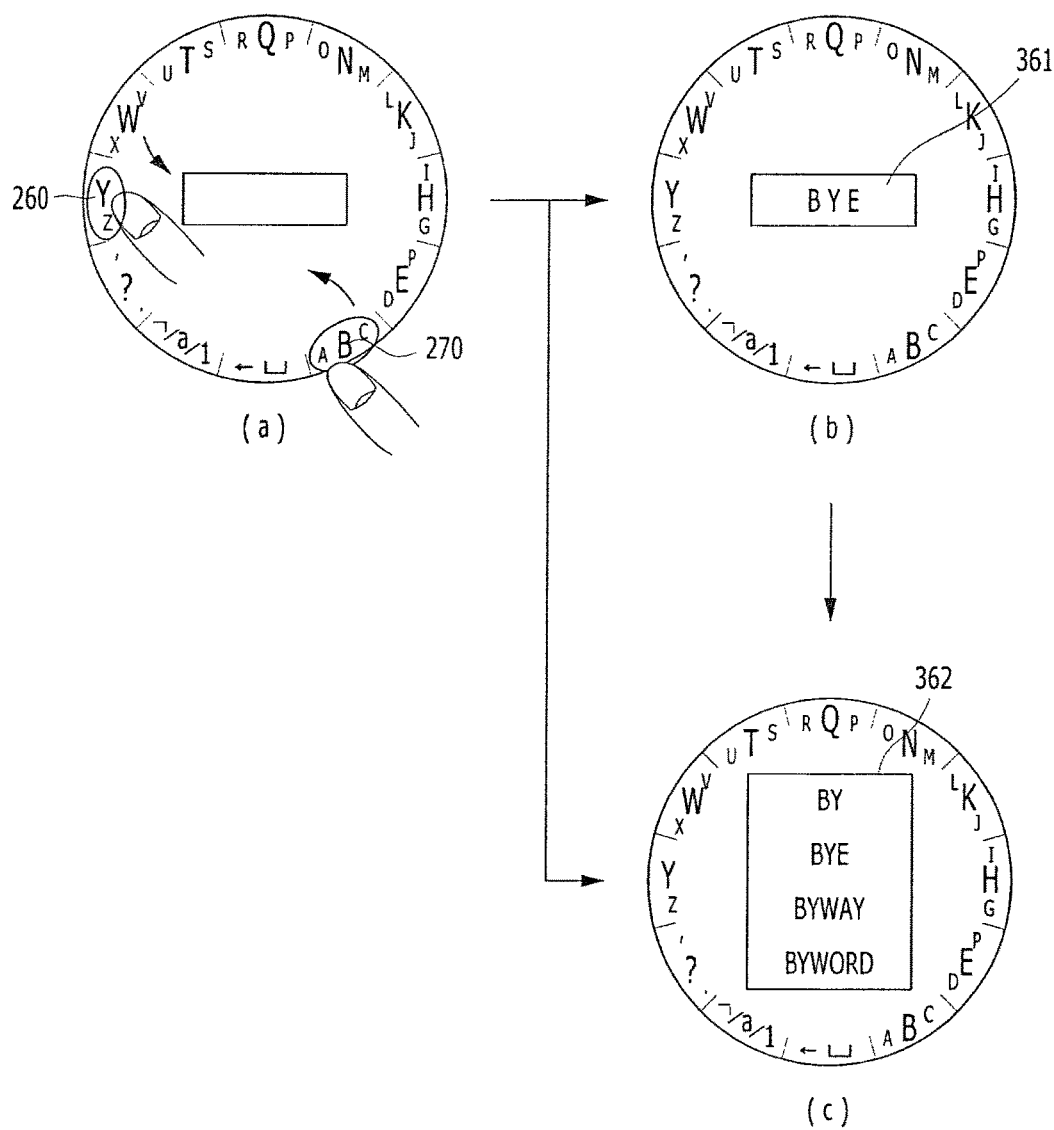
Figure 25:
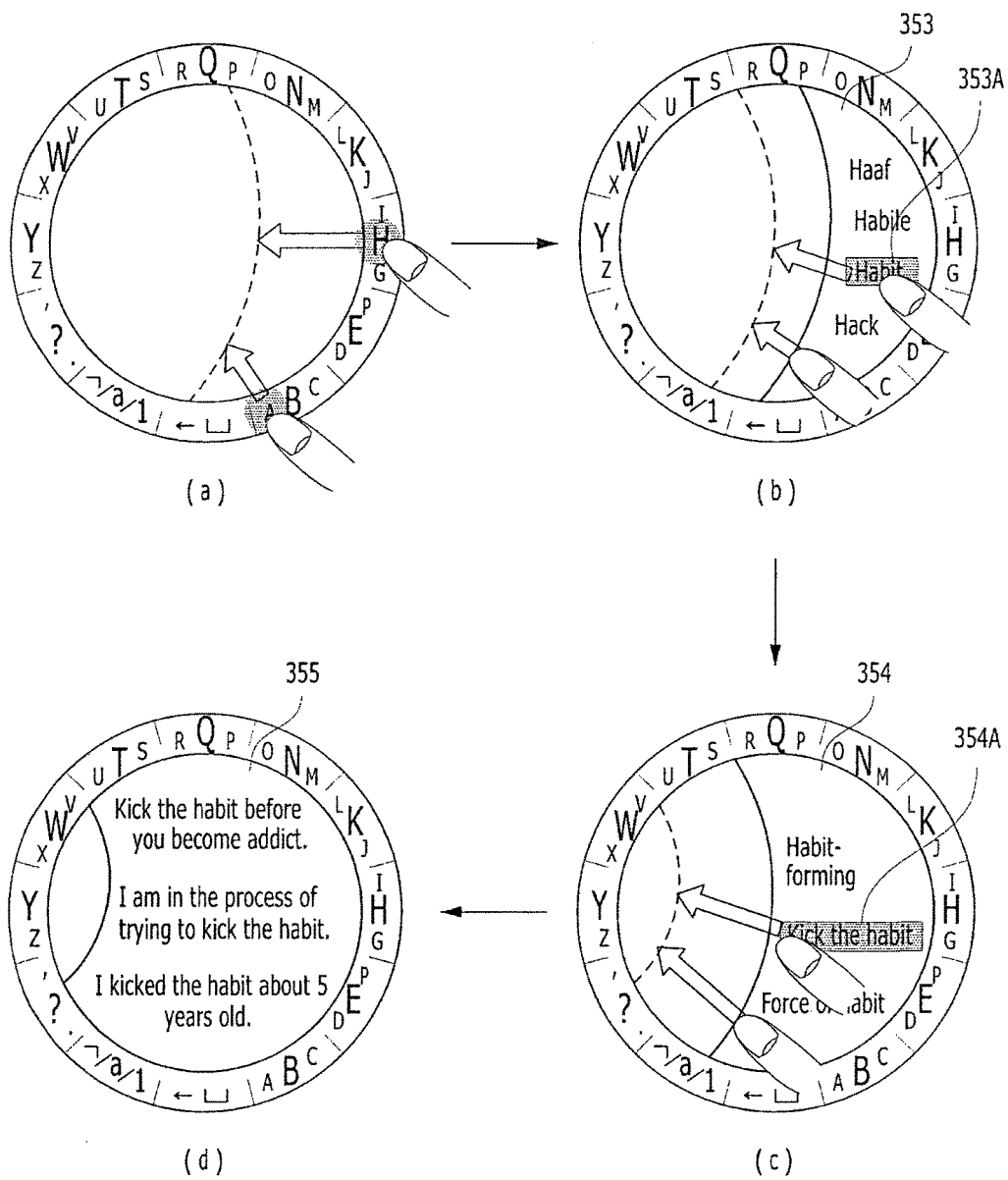
Figure 26:
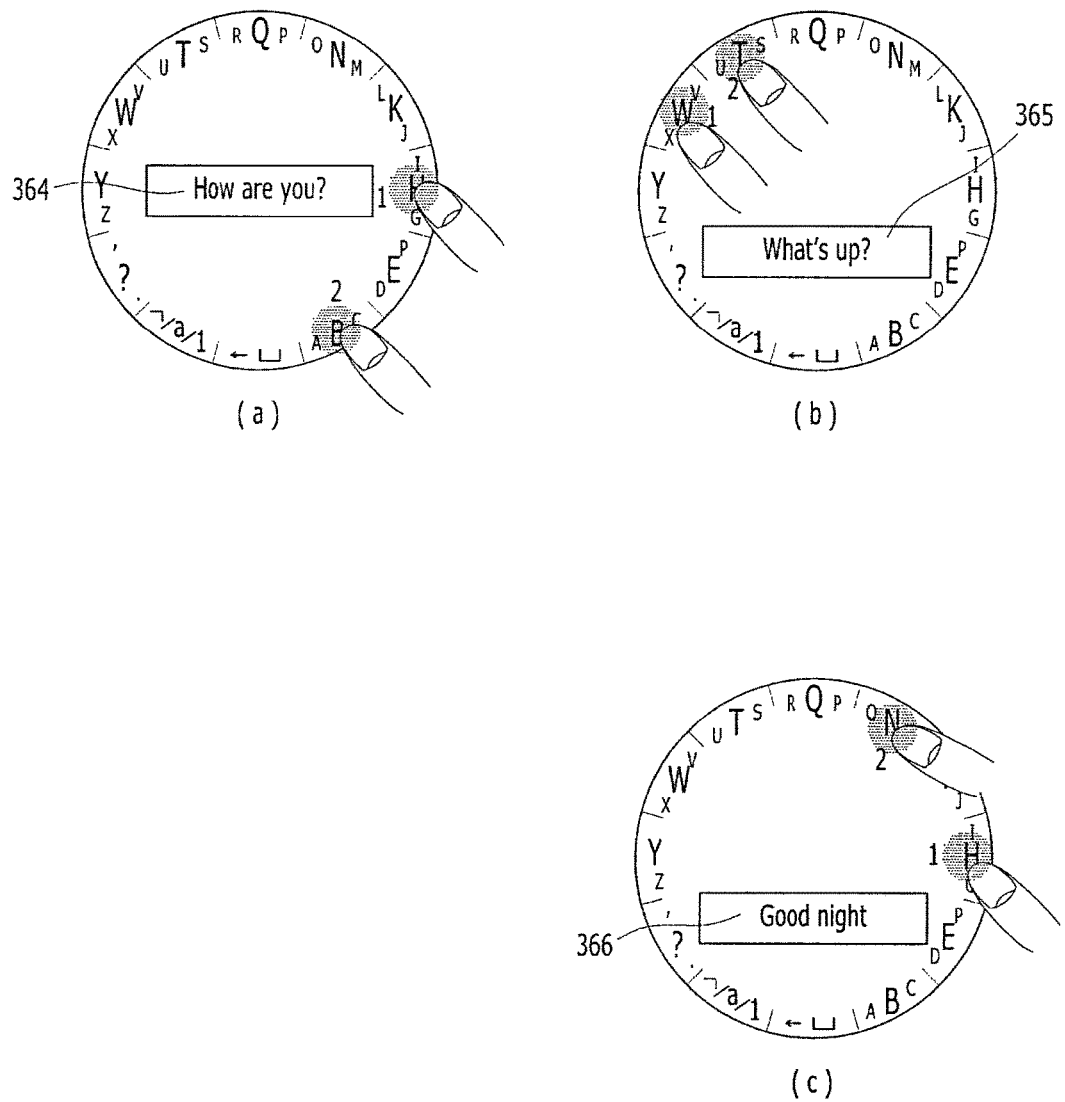

Subsequently, as shown in FIG. 14, if a first side on which the IME is displayed is touched and dragged to an opposite second side on which the IME is displayed in the screen, the controller 180 can provide a voice recognition function to a user via a microphone 122.

As an example, as shown in FIG. 14(a), if a first touch key of the IME, which is positioned at the top of the screen including a search window, is touched and dragged to a second touch key of the IME, which is positioned at the bottom of the screen, as shown in FIG. 14(b), the controller 180 drives a microphone 122 configured to recognize audio, recognizes user voice inputted via the microphone 122 and can automatically put a text sentence corresponding to the recognized voice in the search window.

As shown in FIG. 14(c), if a specific touch key 240 of the IME is selected, an audio search word is inputted via the microphone 122 and the audio search word is recognized, the controller 180 searches for information related to the audio search word in a category range associated with at least one or more characters assigned to the selected touch key 240 and displays the searched information on the screen as shown in FIG. 14(d).

As an example, "D" character indicates a dictionary search category of "Dictionary", "S" character indicates a web search category of "Search", "M" character indicates a music search category of "Music", "C" character indicates a contact search category of "Contact" and "A" character indicates an application search category of "Application", respectively. In this case, if a touch key 240 to which the "S" character is assigned is selected and "hello" audio search word is recognized, the controller 180 searches for information related to the "hello" audio search word within a web category range and displays the searched result on the screen.

As a different example, if a touch key to which the "M" character is assigned is selected and "hello" audio search word is recognized, the controller searches for at least one or more music files including the "hello" audio search word and can display the searched result on the screen.

As a further different example, if a touch key to which the "C" character is assigned is selected and "hello" audio search word is recognized, the controller searches for at least one or more contacts including the "hello" audio search word and can display the searched result on the screen.

Subsequently, as shown in FIG. 15, if a first side on which the IME is displayed is touched and dragged to an opposite second side on which the IME is displayed in the screen, the controller 180 can provide an Emoji list 332 including at least one or more emoticons to a user in a manner of displaying the Emoji list on the screen.

As an example, as shown in FIG. 15(a), if a first touch key of the IME, which is positioned at the right of a screen including a search window, is touched and dragged to a second touch key of the IME, which is positioned at the left of the screen, as shown in FIG. 15(b), the controller 180 displays the Emoji list 332 on the screen using such a visual effect as the Emoji list 332 ascending from the right of the screen to the left of the screen.

If at least one or more emoticons are selected from the Emoji list 332, the controller 180 can automatically put the selected emoticon in the search window.

And, if a left border line of the Emoji list 332 is touched and dragged to a right direction of the screen, the controller 180 can make the Emoji list 332 disappear from the screen using such a visual effect as the Emoji list 332 descending to the right direction of the screen.

Subsequently, as shown in FIG. 16, if a first side on which the IME is displayed is touched and dragged to an opposite second side on which the IME is displayed in the screen, the controller 180 can provide a clipboard 333 including at least one or more previously copied texts to a user in a manner of displaying the clipboard 333 on the screen.

As an example, as shown in FIG. 16(a), if a first touch key of the IME, which is positioned at the left of a screen including a search window, is touched and dragged to a second touch key of the IME, which is positioned at the right of the screen, as shown in FIG. 16(b), the controller 180 displays the clipboard 333 using such a visual effect as the clipboard 333 ascending from the left of the screen to the right direction.

If at least one or more texts are selected from the clipboard 333, the controller 180 can paste the selected text in the search window.

If a right border line of the clipboard 333 is touched and dragged to the left direction of the screen, the controller 180 can make the clipboard 333 disappear from the screen using such a visual effect as the clipboard 333 descending to the left direction of the screen.

Subsequently, as shown in FIG. 17, if a specific touch key of the IME is pulled toward the inside of a screen by a drag touch gesture of a user, the controller 180 can display characters assigned to the touch key in a manner of enlarging the characters.

In particular, as shown in FIG. 17(a), if a specific touch key 230 is touched and dragged to a center direction of the screen more than a predetermined distance in a manner of pulling the specific touch key 230 in the IME toward the center direction of the screen from the IME, as shown in FIG. 17(b), the controller 180 displays the touch key 230 in a manner of enlarging a size of the touch key to make a user easily touch and select 3 characters assigned to the touch key 230, respectively.

Subsequently, referring to FIG. 18, in a state that the touch key 230 is enlarged as shown in FIG. 17, a user can see words related to a specific character using a gesture touching the specific character assigned to the touch key 230 and pulling the specific character toward the inside of the screen.

In particular, as shown in FIG. 18(a), when a specific touch key 230 in the IME is enlarged, if a specific character ("L") among characters assigned to the touch key 230 is touched and dragged toward a center direction of the screen more than a predetermined distance, as shown in FIG. 18(b), the controller 180 searches for at least one or more words related to the specific character ("L") and displays a list 340 of the searched words on the screen.

The at least one or more words related to the specific character ("L") can include at least one selected from the group consisting of a word starting with the specific character ("L"), a word including the specific character ("L") and a recommended word. And, the recommended word can include a recently inputted word or a frequently inputted word among the word starting with the specific character ("L") or the word including the specific character ("L"). The controller 180 can preferentially display the recommended word in a manner of aligning the recommended word in case of displaying the list 340 on the screen.

And, the at least one or more words related to the specific character ("L") can include at least one selected from the group consisting of a word searched by a dictionary, a word searched by a search web site, a previously inputted word, a name of an application installed in a mobile terminal 100, a name of a contact, a name of a music file, a name of a menu, a name of an image file, a name of a document file, a name of a video file, a name of schedule, a name of alarm and a useful sentence predetermined by a user.

If a specific word is selected from the list 340, the controller 180 automatically puts the selected word in the screen. Meanwhile, the controller 180 can scroll word items included in the list up and down in response to a drag touch action of a user dragging the list 340 in an up/down direction.

Subsequently, as shown in FIG. 19, when a list 341 including at least one or more words related to a character selected by a user is displayed as shown in FIG. 18, if a specific word of the list 341 is touched and dragged toward the inside of the screen, the controller 180 searches for sentences related to the specific word and can display the sentences on the screen.

In particular, as shown in FIG. 19(a), if a specific word 341A of the list 341 is touched and dragged toward a center direction of the screen more than a predetermined distance, as shown in FIG. 19(b), the controller 180 searches for at least one or more sentences related to the specific word 341A and may be then able to display a list 342 of the searched sentences on the screen.

The at least one or more sentences related to the specific word 341A can include at least one selected from the group consisting of a sentence starting with the specific word 341A, a sentence including the specific word 341A and a recommended sentence among the sentence starting with the specific word 341A and the sentence including the specific word 341A. The recommended sentence may include a recently inputted sentence or a frequently inputted sentence among the sentence starting with the specific word 341A and the sentence including the specific word 341A. The controller 180 can preferentially display the recommended sentence in a manner of aligning the recommended sentence in case of displaying the list 341.

If a specific sentence is selected from the list 340, the controller 180 automatically put the selected sentence on the screen. Meanwhile, the controller 180 can scroll sentence items included in the list up and down in response to a drag touch action of a user dragging the list 341 in up/down direction.

Meanwhile, the at least one or more sentences related to the specific word 341A can include at least one selected from the group consisting of a sentence searched by a dictionary, a sentence searched by a search web site, a previously inputted sentence, a sentence included in a memo, a sentence included in a contact, a sentence included in a document file and a useful sentence predetermined by a user.

Subsequently, as shown in FIG. 20(a), when a specific touch key 230 in the IME is enlarged and a specific character ("L") among characters assigned to the touch key 230 is touched, if the specific character is firstly dragged toward a center direction of the screen more than a first distance, as shown in FIG. 20(b), the controller 180 searches for at least one or more words related to the specific character ("L") and displays a list 341 of the searched words on the screen.

The at least one or more words related to the specific character ("L") can include at least one selected from the group consisting of a word starting with the specific character ("L"), a word including the specific character ("L") and a recommended word. And, the recommended word can include a recently inputted word or a frequently inputted word among the word starting with the specific character ("L") and the word including the specific character ("L"). The controller 180 can preferentially display the recommended word in a manner of aligning the recommended word in case of displaying the list 340 on the screen.

The at least one or more words related to the specific character ("L") can include at least one selected from the group consisting of a word searched by a dictionary, a word searched by a search web site, a previously inputted word, a name of an application installed in a mobile terminal 100, a name of a contact, a name of a music file, a name of a menu, a name of an image file, a name of a document file, a name of a video file, a name of schedule, a name of alarm and a useful sentence predetermined by a user.

In this case, if a specific word 341A is selected from the list 341 in a manner of being continuously touched twice, the controller 180 can automatically put the selected word 341A on the screen.

When the specific word 341A of the list 341 is touched, if the specific word is secondly dragged toward the center direction of the screen more than a second distance, as shown in FIG. 20(c), the controller 180 searches for at least one or more idioms related to the specific word ("like") and displays a list 342 of the searched idioms.

The at least one or more idioms related to the specific word ("like") can include at least one selected from the group consisting of an idiom starting with the specific word ("like"), an idiom including the specific word ("like") and a recommended idiom. And, the recommended idiom can include a recently inputted idiom or a frequently inputted idiom among the idiom starting with the specific word ("like") and the idiom including the specific word ("like"). The controller 180 can preferentially display the recommended idiom in a manner of aligning the recommended idiom in case of displaying the list 340 on the screen.

The at least one or more idioms related to the specific word ("like") can include at least one selected from the group consisting of an idiom searched by a dictionary, an idiom searched by a search web site, a previously inputted idiom, a name of an application installed in a mobile terminal 100, a name of a contact, a name of a music file, a name of a menu, a name of an image file, a name of a document file, a name of a video file, a name of schedule, a name of alarm and a useful sentence predetermined by a user.

In this case, if a specific idiom 342A included in the list 342 is continuously touched twice, the controller 180 can automatically put the selected idiom 342A on the screen.

When the specific idiom 342A of the list 342 is touched, if the specific idiom is thirdly dragged toward a center direction of the screen more than a third distance, as shown in FIG. 20(d), the controller 180 searches for at least one or more sentences related to the specific idiom 342A ("Love you") and displays a list 343 of the searched sentences on the screen.

The at least one or more sentences related to the specific idiom ("Love you") can include at least one selected from the group consisting of a sentence starting with the specific idiom ("Love you"), a sentence including the specific idiom ("Love you") and a recommended sentence. And, the recommended sentence can include a recently inputted sentence or a frequently inputted sentence among the sentence starting with the specific idiom ("Love you") and the sentence including the specific idiom ("Love you"). The controller 180 can preferentially display the recommended sentence in a manner of aligning the recommended sentence in case of displaying the list 343 on the screen.

The at least one or more sentences related to the specific idiom ("Love you") can include at least one selected from the group consisting of a sentence searched by a dictionary, a sentence searched by a search web site, a previously inputted sentence, a sentence included in a memo, a sentence included in a contact, a sentence included in a document file and a useful sentence predetermined by a user.

If a specific sentence is selected from the list 343, the controller 180 automatically put the selected sentence on the screen. Meanwhile, the controller 180 can scroll sentence items included in the list 343 in response to a drag touch action of a user dragging the list 343 in up/down direction.

Subsequently, as shown in FIG. 21, if a touch key 240 of the IME configured to input a sign is touched and dragged toward the inside of the screen, the controller 180 can display a sign list including at least one or more signs on the screen.

In particular, as shown in FIG. 21(a), when the touch key 240 of the IME configured to input a specific sign is touched, if the touch key is dragged toward a center direction of the screen more than a predetermined distance, as shown in FIG. 21(b), the controller 180 displays a sign list 351 including at least one or more signs in a predetermined area of the screen.

If a drag touch gesture in a down direction is inputted on the area on which the list 351 is displayed, the controller 180 can make the list 351 disappear from the screen.

Subsequently, as shown in FIG. 22(a), when a character mode switching touch key 250 of the IME is touched, if the character mode switching touch key is dragged toward a center direction of the screen more than a predetermined distance, as shown in FIG. 21(b), the controller 180 displays a language setting menu 352, which is configured to set a language of characters to be displayed on touch keys of the IME in a manner of being respectively assigned to the touch keys, on the screen. If a specific language is set via the language setting menu 352, the controller displays characters of the set language on the touch keys in a manner of assigning the characters to the touch keys, respectively.

Subsequently, as shown in FIG. 23 to FIG. 26, if two or more (e.g., a first and a second touch key) touch keys among touch keys included in the IME are touched, the controller 180 can display a list of at least one or more words or sentences including a first character and a second character assigned to the first and the second touch key, respectively.

First of all, as shown in FIG. 23(a), when the first touch key 260 and the second touch key 270 are touched in the IME, if the first and the second touch key are pinched in within a predetermined distance, as shown in FIGS. 23(b) and (c), the controller 180 searches for at least one or more words or sentences including the first and the second character assigned to the first and the second touch key 260/270 and displays the at least one or more words or sentences on the screen.

In this case, the at least one or more words or sentences including the first and the second character may correspond to words or sentences searched by a search web site or an input combination of the first and the second touch key 260/270 to which a specific frequently used word or a specific frequently used sentence is set by a user.

In particular, as shown in FIG. 24(a), if the first and the second touch key 260/270 are long touched, as shown in FIG. 24(b), the controller 180 displays a list 363 of at least one or more frequently used words or sentences set to the input combination of the first and the second touch key 260/270. A user can delete, add or edit a specific frequently used word or sentence in the list.

And, as an example, FIG. 23(b) shows a case that a single word ("BYE") 361 including a first character and a second character assigned to the first and the second touch key 260/270 is searched and the searched word 361 is automatically put on the screen.

As a different example, FIG. 23(c) shows a case that two or more words including the first character and the second character assigned to the first and the second touch key 260/270 are searched and a list 362 of the two or more words is displayed on the screen.

Subsequently, as shown in FIG. 25(a), when the first and the second touch key are touched among touch keys of the IME, if the first and the second touch key are firstly dragged toward a center direction of the screen more than a first distance, as shown in FIG. 25(b), the controller 180 searches for at least one or more words related to a specific first and a second character ("H" and "A") assigned to the first and the second touch key and displays a list 353 of the searched words on the screen.

The at least one or more words related to the specific first and the second character ("H" and "A") can include at least one selected from the group consisting of a word starting with the specific first and the second character ("H" and "A"), a word including the specific first and the second character ("H" and "A") and a recommended word. And, the recommended word can include a recently inputted word or a frequently inputted word among the word starting with the specific first and the second character ("H" and "A") and the word including the specific first and the second character ("H" and "A"). The controller 180 can preferentially display the recommended word in a manner of aligning the recommended word in case of displaying the list 353.

The at least one or more words related to the specific first and the second character ("H" and "A") can include at least one selected from the group consisting of a word searched by a dictionary, a word searched by a search web site, a previously inputted word, a name of an application installed in a mobile terminal 100, a name of a contact, a name of a music file, a name of a menu, a name of an image file, a name of a document file, a name of a video file, a name of schedule, a name of alarm and a useful sentence predetermined by a user.

If a specific word 353A is selected from the list 353 in a manner of being continuously touched twice, the controller 180 can automatically put the selected word 353A on the screen.

When the specific word 353A is selected from the list 353, if a specific first point and a specific second point are touched on the list 353 and the specific first point and the specific second point are secondly dragged toward the center direction of the screen more than a second distance, as shown in FIG. 25(c), the controller 180 searches for at least one or more idioms related to the specific word ("Habit") 353A and displays a list 354 of the searched idioms on the screen.

The at least one or more idioms related to the specific word ("Habit") can include at least one selected from the group consisting of an idiom starting with the specific word ("Habit"), an idiom including the specific word ("Habit") and a recommended word. And, the recommended word can include a recently inputted idiom or a frequently inputted idiom among the idiom starting with the specific word ("Habit") and the idiom including the specific word ("Habit"). The controller 180 can preferentially display the recommended word in a manner of aligning the recommended word in case of displaying the list 354.

The at least one or more idioms related to the specific word ("Habit") can include at least one selected from the group consisting of an idiom searched by a dictionary, an idiom searched by a search web site, a previously inputted idiom, a name of an application installed in a mobile terminal 100, a name of a contact, a name of a music file, a name of a menu, a name of an image file, a name of a document file, a name of a video file, a name of schedule, a name of alarm and a useful sentence predetermined by a user.

If a specific idiom 354A is selected from the list 354 in a manner of being continuously touched twice, the controller 180 can automatically put the selected idiom 354A on the screen.

When the specific idiom 354A is selected from the list 354, if a specific first point and a specific second point are touched on the list 354 and the specific first point and the specific second point are thirdly dragged toward the center direction of the screen more than a third distance, as shown in FIG. 25(d), the controller 180 searches for at least one or more sentences related to the specific idiom ("Kick the habit") 354A and displays a list 355 of the searched sentences on the screen.

The at least one or more sentences related to the specific idiom ("Kick the habit") can include at least one selected from the group consisting of a sentence starting with the specific idiom ("Kick the habit"), a sentence including the specific idiom ("Kick the habit") and a recommended sentence. And, the recommended sentence can include a recently inputted sentence or a frequently inputted sentence among the sentence starting with the specific idiom ("Kick the habit") and the sentence including the specific idiom ("Kick the habit"). The controller 180 can preferentially display the recommended sentence in a manner of aligning the recommended sentence in case of displaying the list 355.

Meanwhile, the at least one or more sentences related to the specific idiom ("Kick the habit") can include at least one selected from the group consisting of a sentence searched by a dictionary, a sentence searched by a search web site, a previously inputted sentence, a sentence included in a memo, a sentence included in a contact, a sentence included in a document file and a useful sentence predetermined by a user.

If a specific sentence is selected from the list 355, the controller 180 automatically puts the selected sentence on the screen.

Subsequently, as shown in FIG. 26(a), if a first touch key to which "H" character is assigned is touched in the IME and then a second touch key to which "A" character is assigned is touched, the controller 180 can automatically put at least one or more sentence (or words) 364 including the "H" and the "A" character on the screen in accordance with an order of touching the "H" and the "A" character.

More specifically, when the first key to which the "H" character is assigned is touched, if the second touch key to which the "H" character is assigned is touched and is pinched in to a direction of the first key to which the "H" character is assigned, the controller 180 searches for at least one or more sentences including the "A" character among sentences including the "H" character. If there exists a single searched sentence, the controller automatically puts the searched sentence on the screen. If there exist two or more searched sentences, the controller displays a list of the searched sentences on the screen. The controller may automatically put a frequently used sentence, which is set to a touch order combination of the "H" and the "A" character, on the screen as well.

Subsequently, as shown in FIG. 26(b), when a first key to which "W" character is assigned is touched, if a second touch key to which "T" character is assigned is touched and is pinched-in to a direction of the first key to which the "W" character is assigned, the controller 180 searches for at least one or more sentences (or words) including the "T" character among sentences including the "W" character. If there exists a single searched sentence, the controller automatically puts the searched sentence on the screen. If there exist two or more searched sentences, the controller displays a list of the searched sentences on the screen. The controller may automatically put a frequently used sentence, which is set to a touch order combination of the "W" and the "T" character, on the screen as well.

Subsequently, as shown in FIG. 26(c), when a first key to which "G" character is assigned is touched, if a second touch key to which "N" character is assigned is touched and is pinched-in to a direction of the first key to which the "G" character is assigned, the controller 180 searches for at least one or more sentences (or words) including the "N" character among sentences including the "G" character. If there exists a single searched sentence, the controller automatically puts the searched sentence on the screen. If there exist two or more searched sentences, the controller displays a list of the searched sentences on the screen. The controller may automatically put a frequently used sentence, which is set to a touch order combination of the "G" and the "N" character, on the screen as well.

Subsequently, as shown in FIG. 27, if a specific touch key among touch keys of the IME is long touched and the long touch is maintained, the controller 180 can display at least one or more words or sentences including at least one or more characters assigned to the touch key on which the long touch is maintained.

As an example, as shown in FIG. 27(a), if a specific touch key of the IME is long touched and maintained, the controller 180 displays words or sentences including at least one or more characters ("H"), which are assigned to the touch key on which the long touch is maintained, in a manner of arranging the words or the sentences to the inside of the screen along with a border of the IME in a form of items.

In this case, a user can select a preferred item by touching and dragging the items in a clockwise direction or an anticlockwise direction like as rotating a wheel.

In particular, as shown in FIG. 27(b), if a prescribed item among the items is positioned at a highlighted central point in a manner of touching and dragging the prescribed item, the controller 180 can automatically put a word or a sentence corresponding to the item positioned at the central point on the screen.

If a prescribed item among the items is positioned at the highlighted central point in a manner of touching and dragging the prescribed item and then the touch touching the central point is released, the controller 180 can automatically put a word or a sentence corresponding to the item positioned at the central point on the screen.

If a prescribed item among the items is touched and released, the controller 180 can automatically put a word or a sentence corresponding to the item positioned at a point on which the touch is released on the screen.

When a prescribed item among the items is touched, if a touch touching the touch key on which the long touch is maintained is released, the controller 180 can automatically put a word or a sentence corresponding to the touched item on the screen.

If a prescribed item among the items is touched and dragged toward a center direction of the screen, the controller 180 can automatically put a word or a sentence corresponding to the item dragged toward the center direction on the screen.

Subsequently, as shown in FIG. 28, the controller 180 can provide an IME to a user in a manner of reconfiguring the IME to a left hand-dedicated IME or a right hand-dedicated IME according to a position of a wrist on which a mobile terminal 100 of a smartwatch type is worn by the user.

As shown in FIG. 28(a), the controller 180 detects whether a mobile terminal 100 is worn on a left wrist or a right wrist of a user via an acceleration sensor of a sensor unit 140. If it is detected that the mobile terminal is worn on the left wrist, the controller displays touch keys in the IME in a manner of relocating the touch keys in a position where a right hand is easy to operate the touch keys.

As an example, FIG. 28(a) shows a case that the touch keys in the IME are arranged in an anticlockwise direction to make a user easily operate the touch keys by a right hand.

As shown in FIG. 28(b), if it is detected that a mobile terminal 100 is worn on the right wrist via an acceleration sensor of a sensing unit 140, the controller 180 displays touch keys in the IME in a manner of relocating the touch keys in a position where a left hand is easy to operate the touch keys.

As an example, FIG. 28(b) shows a case that the touch keys in the IME are arranged in a clockwise direction to make a user easily operate the touch keys by a left hand.

Figure 29:
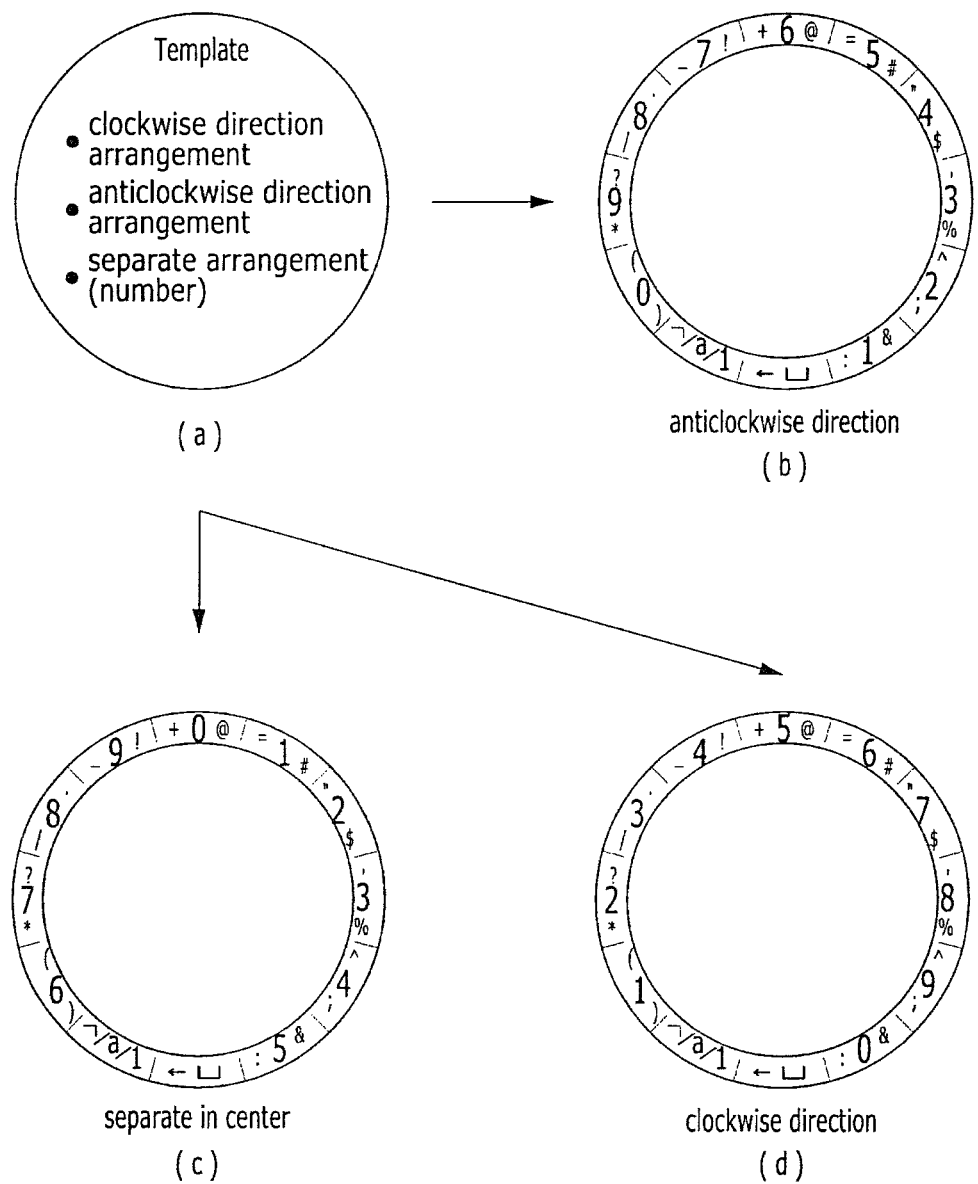

Subsequently, as shown in FIG. 29, the controller 180 can provide a user with an arrangement setting menu of touch keys in the IME.

As shown in FIG. 29(a), the controller 180 provides a user with an arrangement setting menu configured to arrange touch keys of the IME using at least one or more schemes and the user can use the touch keys of the IME in a manner of arranging the touch keys by a preferred way via the arrangement setting menu.

As an example, the arrangement setting menu can include at least one selected from the group consisting of a first menu configured to arrange the touch keys in the IME in an anticlockwise direction as shown in FIG. 29(b), a second menu configured to arrange the touch keys in the IME in a manner of separating the touch keys from each other on the basis of a center as shown in FIG. 29(c) and a third menu configured to arrange the touch keys in the IME in a clockwise direction as shown in FIG. 29(d).

Subsequently, as shown in FIG. 30, the controller 180 can change a position of a touch key in the IME to a position selected by a user in the IME.

As shown in FIG. 30(a), if a specific first touch key in the IME is long touched, as shown in FIG. 30(b), if the long touched touch key is dragged and dropped between a second touch key and a third touch key among other touch keys in the IME, the controller 180 displays the first touch key in a manner of moving the first touch key between the second and the third touch key. And, an original position of the first touch key in the IME is pushed by surrounding touch keys and a circle form of the IME is maintained.

Subsequently, as shown in FIG. 31 to FIG. 34, the controller 180 establishes communication with at least one or more peripherals in a manner of pairing with the at least one or more peripherals via a wireless communication unit 110 and can share content related to text input with the peripherals.

First of all, referring to FIG. 31, a text used to be inputted in a smartwatch 100 can be continuously inputted in the peripheral device paired with the smartwatch.

In particular, as shown in FIG. 31(a), when the smartwatch is paired with the peripheral device and a specific text 367 is inputted via the IME, if a sharing command indicating sharing of the text 367 is inputted from a user, the controller 180 transmits the text 367 and status information of an application providing a writing function of the text 367 to the peripheral device via the wireless communication unit 110.

Subsequently, as shown in FIG. 31(b), the peripheral device drives an identical application in environment identical to that of the text 367 written by the smartwatch 100 based on the received status information of the application and displays the received text 367 on a screen of the driven application. By doing so, the peripheral device can provide a text input environment identical to that of the smartwatch 100 to a user.

In this case, the text 367 sharing command of the user may correspond to a predetermined motion gesture of the user. In particular, if a motion gesture making the smartwatch 100 shake is detected via a motion sensor of the sensing unit 140, the controller 180 can transmit a currently written text and current status information of an application providing a writing function of the text to the peripheral device.

Consequently, if a user feels uncomfortable while writing a text via the IME of the smartwatch 100 of a small screen, the user is able to write the text in succession in the peripheral device such as a smartphone in environment identical to that of the smartwatch 100.

Figure 32:
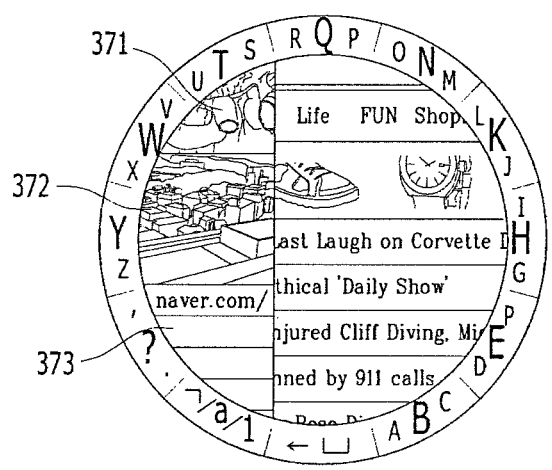

Subsequently, referring to FIG. 32, the controller 180 can share contents stored in clipboards of the smartwatch 100 and contents stored in clipboards of the peripheral device paired with the smartwatch with each other. As an example, among first to third content 371/372/373 displayed on the clipboards of a screen of the smartwatch 100, the first and the second content 371/372 may correspond to contents originally owned by the smartwatch 100 and the third content 373 may correspond to content owned by the peripheral device.

In this case, the content stored in the clipboard includes at least one selected from the group consisting of an image, a text, an URL (uniform resource locator), a bookmark and a content recently generated by the smartwatch 100 or the peripheral device. The generated content can include a picture/video captured by a camera, an audio file recorded via a microphone and the like.

Figure 33:
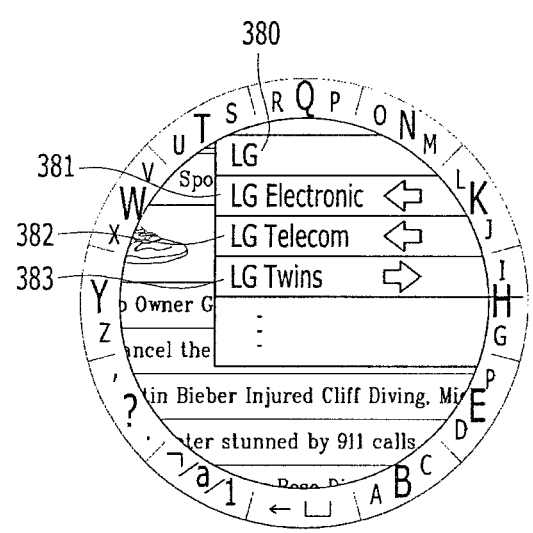

Subsequently, referring to FIG. 33, in case of inputting a text by a smartwatch 100, the controller 180 can provide a user with a predictive text input function based on a text history stored in the peripheral device paired with the smartwatch.

In particular, the controller 180 requests a history of texts inputted by the peripheral device to the peripheral device and receives the history from the peripheral device. When a user inputs a specific text 380 using an IME according to the present invention, the controller 180 searches for texts 381/382/383 related to the inputted specific text from a history of texts inputted in the smartwatch 100 and the history of the texts received from the peripheral device and displays a list of the searched texts 381/382/383 on the screen. A user can select a prescribed text to be automatically completed from the list on the basis of the currently inputted text 380.

The text history can include at least one selected from the group consisting of an accessed or searched URL, an inputted or searched text, an inputted or transmitted E-mail address, a telephone number of an inputted or searched contact and a name of an inputted or searched contact.

Figure 34:
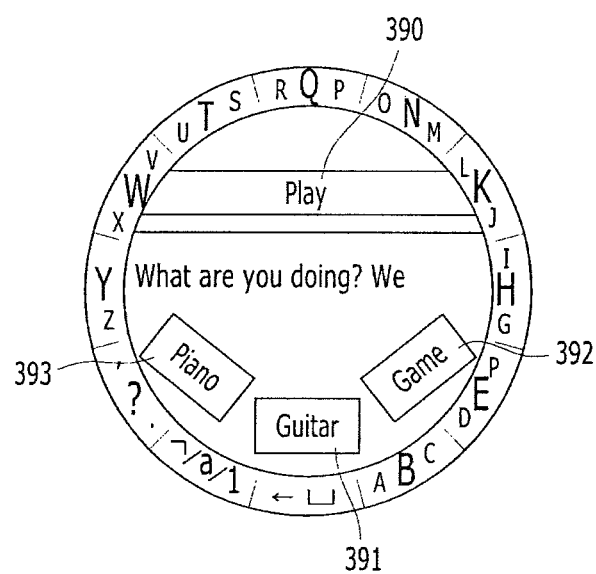

Lastly, referring to FIG. 34, since a frequently used word and a frequently used sentence vary according to a person who is occasionally chatting with, the frequently used word or a frequently used sentence can be recommended based on a chatting content history chatted with a frequent chatting partner and the frequently used word or the frequently used sentence can be used as a frequently used phrase.

In particular, the controller 180 stores a chatting content history chatted with at least one or more chatting partners more than a predetermined numbers in a memory 170. If chatting with the chatting partner is connected and chatting content 390 to be transmitted to the chatting partner is inputted, the controller 180 searches for frequently used chatting contents 391/392/393 in relation to the inputted chatting content 390 from the stored chatting content history and then displays the chatting contents 391/392/393 on the screen.

A user can select a prescribed chatting content to be automatically completed on the basis of the currently inputted chatting content 390 among the chatting contents 391/392/393.

FIG. 35 to FIG. 38 are diagrams for explaining a menu pop-up display process according to the present invention.

Figure 35:
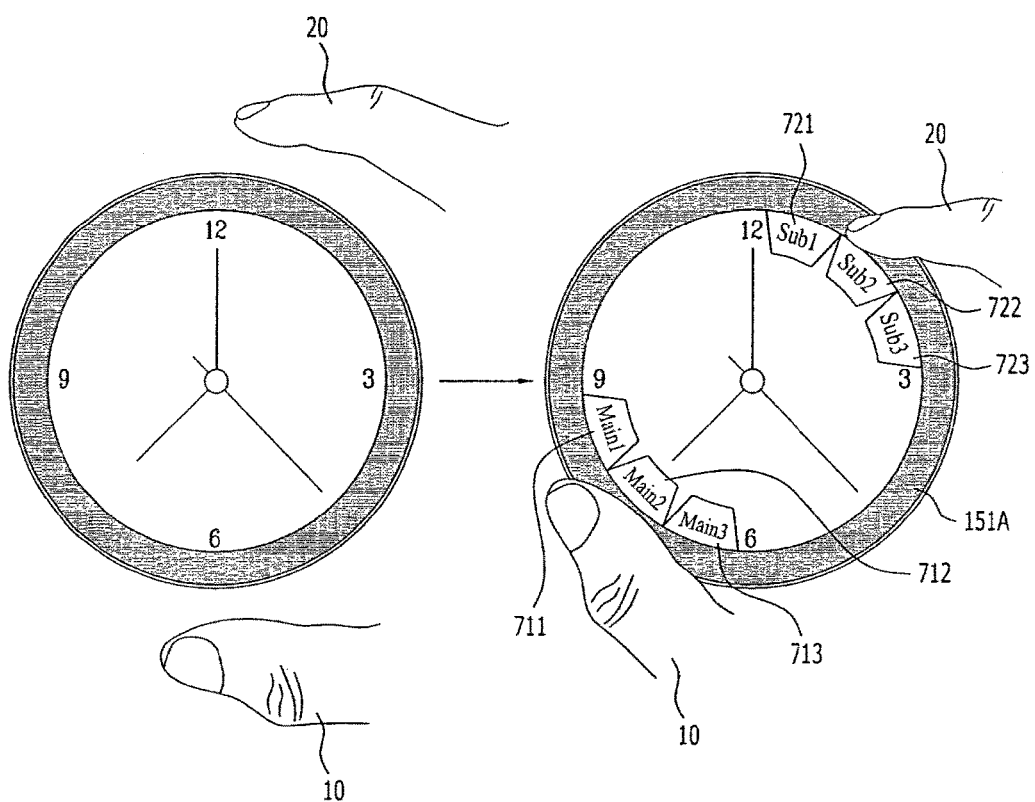

As shown in FIG. 35, if a first point and a second point of the screen are touched by a first pointer 10 and a second pointer 20, respectively, the controller 180 displays at least one or more main menus 711/712/713 in the vicinity of the first point and can display at least one or more sub menus 721/722/723 depending on the main menu 712, which is selected by being positioned at the first point among the main menus 711/712/713, in the vicinity of the second point.

Specifically, touch inputs inputted on the first and the second point are received at the same time or within a predetermined time by the first and the second pointer 10/20, the controller 180 displays a main menu UI (user interface) including at least one or more main menus 711/712/713 in the vicinity of the first point and displays a sub menu UI (user interface) including at least one or more sub menus 721/722/723 in the vicinity of the second point.

In this case, the sub menu UI may correspond to a sub menu UI including the sub menus 721/722/723 depending on the main menu 712, which is selected by being positioned at the first point among the main menus.

In doing so, the controller 180 can display a menu capable of executing a specific command on a touch screen 151.

Figure 36:
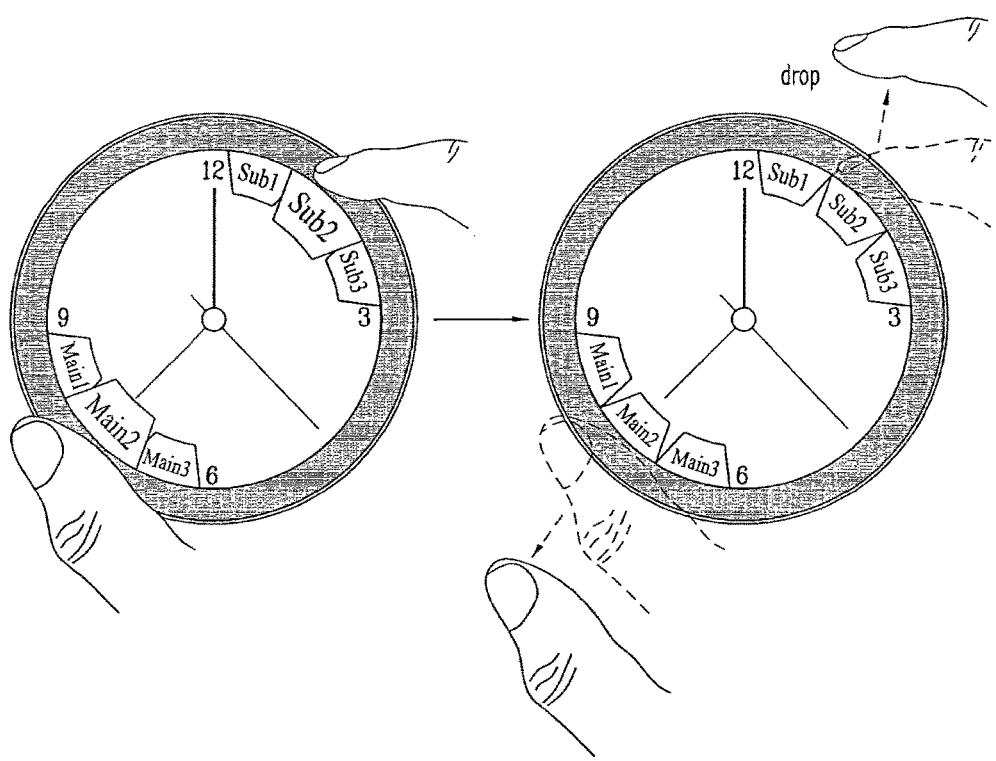

Meanwhile, as shown in FIG. 36, although the touches touching the first point and the second point are released, the controller 180 can continuously display the main menu and the sub menu.

Yet, a user can configure time of maintaining the main menu and the sub menu after the touches are released. A user can make the display of the main menu and the display of the sub menu to be ended after the touches are released and the configured time elapses.

Subsequently, FIGS. 37(A) to 37(C) and FIGS. 38(A) to 38(B) are diagrams for explaining a main menu changing process according to the present invention.

Figure 37A:
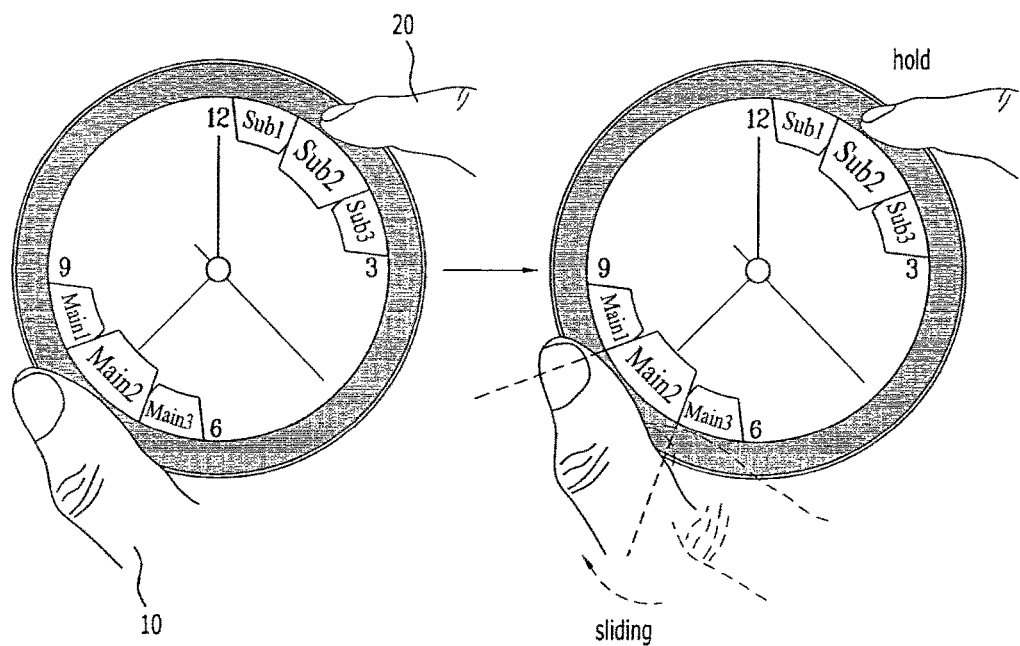
Figure 37B:
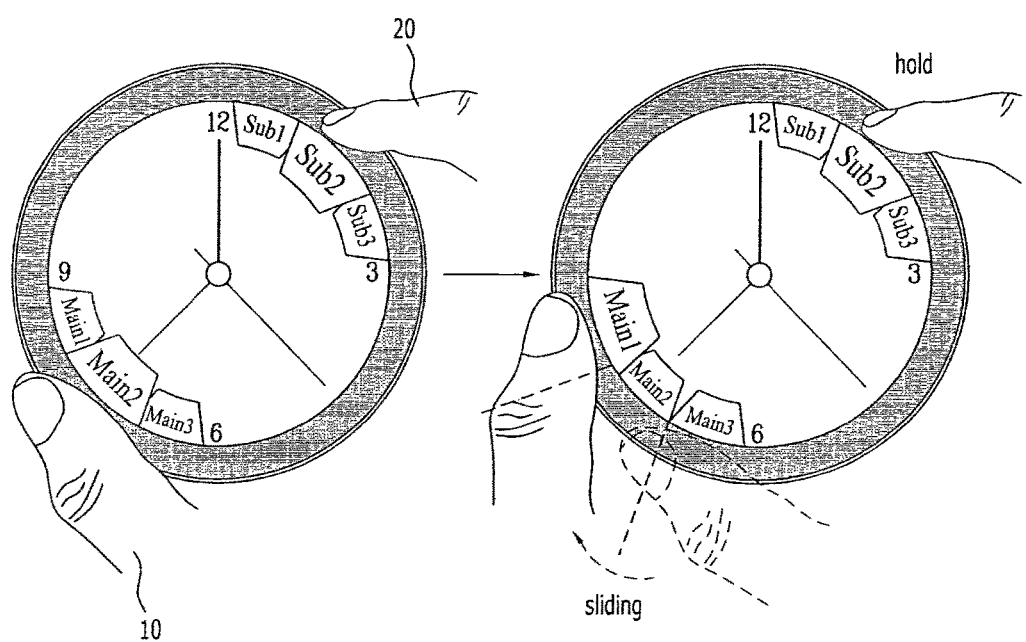
Figure 37C:
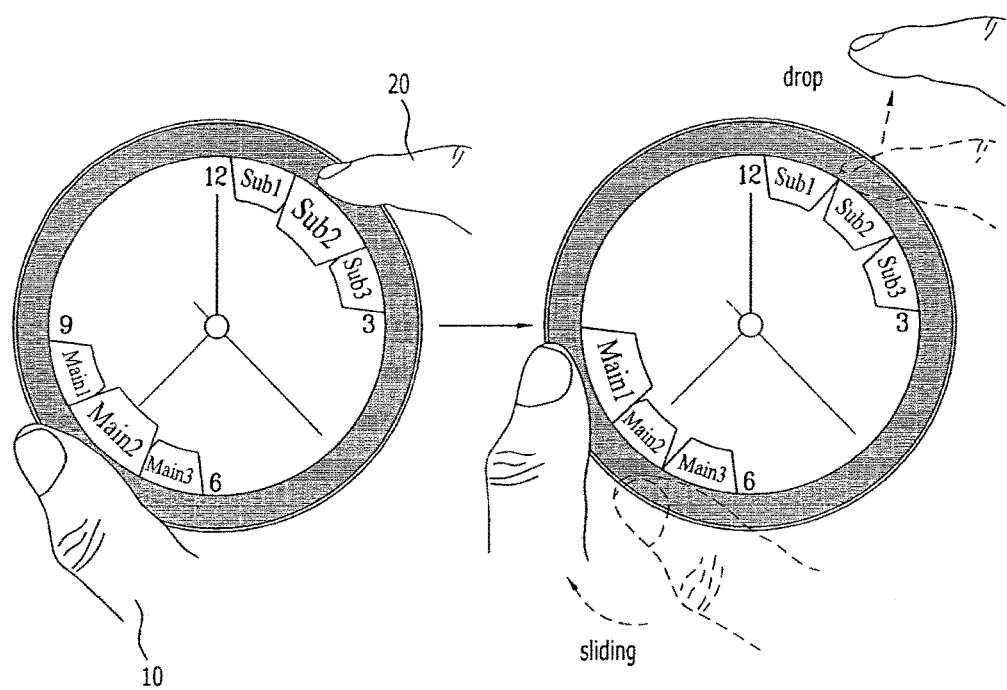
Figure 38A:
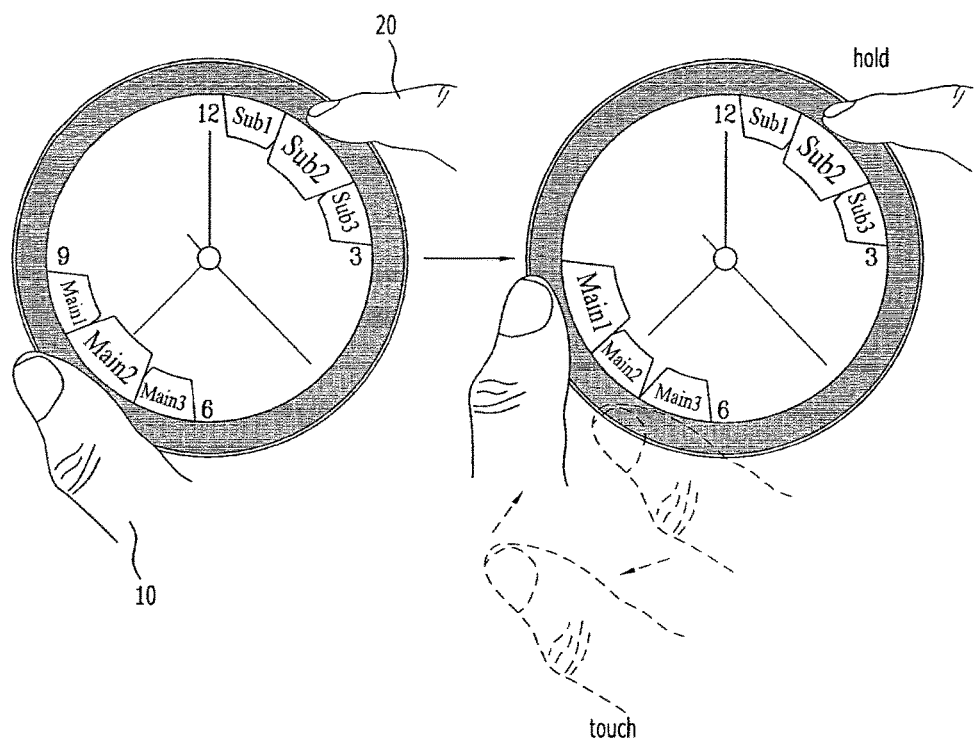
Figure 38B:
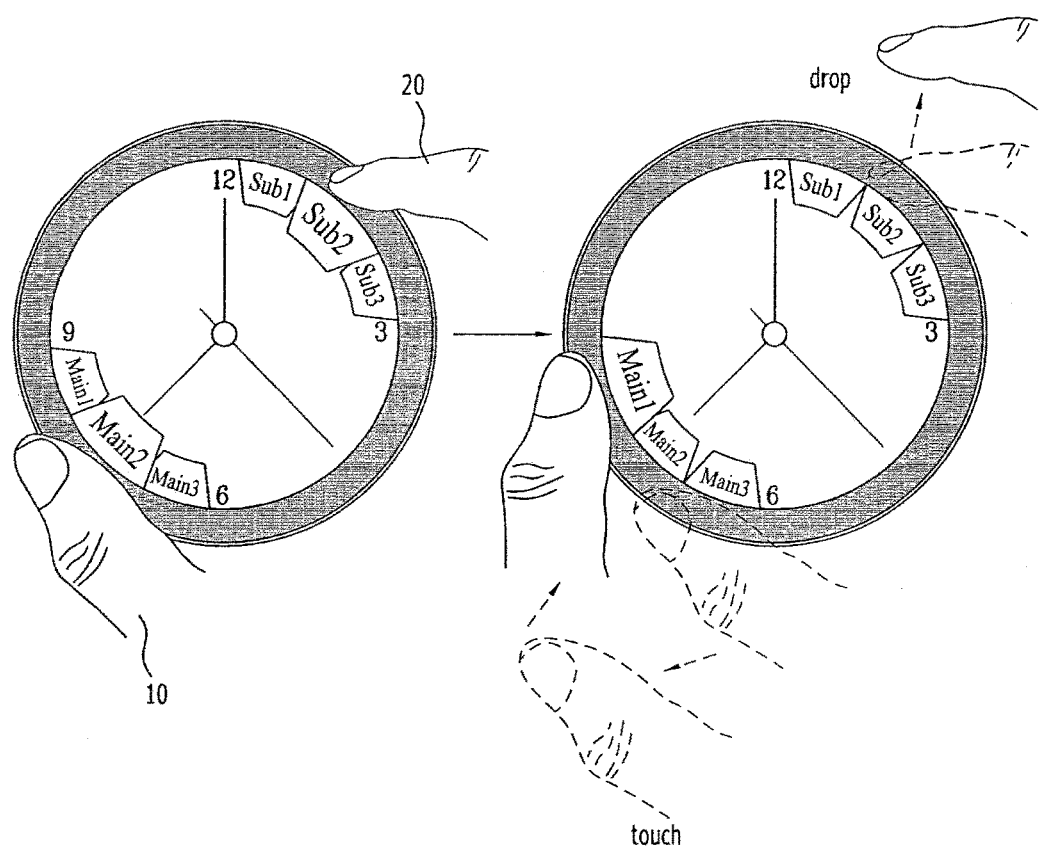
Figure 39A:
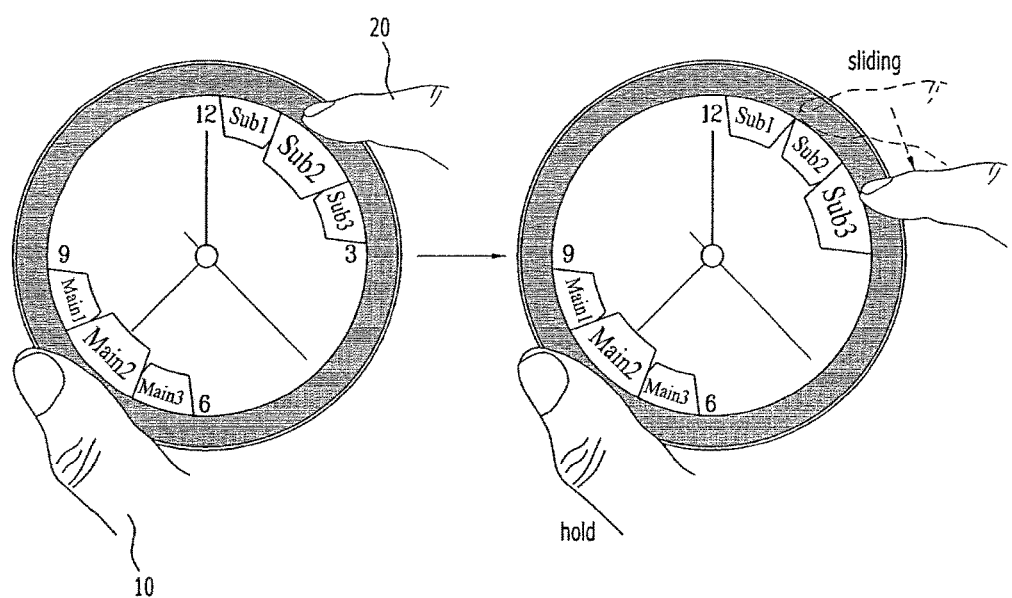
Figure 39B:
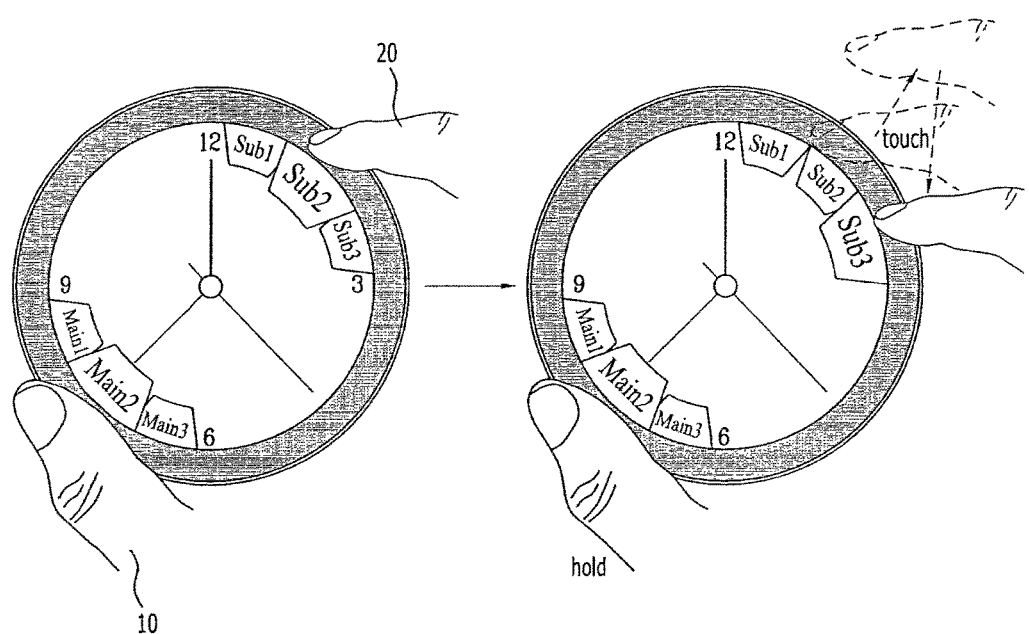

FIGS. 37(A) to 37(C) are diagrams for explaining a main menu changing process using a slide (drag) gesture and FIGS. 38(A) to 38(B) are diagrams for explaining a main menu changing process using a tap gesture. Prior to explaining FIGS. 37(A) to 37(C) and FIGS. 38(A) to 38(B), assume that at least one or more main menus and at least one or more sub menus are displayed on a mobile terminal 100.

If a user input changing a touch point of a first pointer 10 is received on the screen, the controller 180 selects a main menu existing at a changed touch point of the first pointer 10 and can display at least one or more sub menus depending on the selected main menu in the vicinity of a touch point of a second pointer 20.

Referring to FIG. 37(A), if a user input of a slide movement (drag) of which the first pointer 10 does not exceed a predetermined reference [a dotted line section in FIG. 37(A)] along with a border line of the screen where a touch input unit 151A is formed is received, the controller 180 can perform an operation of moving the initially selected main menu according to the movement of the first pointer 10.

In particular, if the first pointer slides less than the predetermined reference, the controller 180 may not change the main menu. In this case, the predetermined reference can be configured by a manufacturer or a user.

Meanwhile, as shown in FIG. 37(B), if a user input of which a sliding movement exceeds the predetermined reference is received, the controller 180 can change a current main menu into a main menu existing at a touch point of a first pointer 10. And, the controller 180 can display at least one or more sub menus depending on the changed main menu in the vicinity of a touch point of a second pointer 20.

Meanwhile, as shown in FIG. 37(c), although a touch touching the second pointer 20 is released, if a user input of the first pointer 10 sliding according to a border line of the screen is received, the controller 180 can change a current main menu into a main menu existing at a touch point of the first pointer 10.

Meanwhile, referring to FIG. 38(A), if the first pointer 10 touching a border line of the screen is released and touches the border line of the screen again, the controller 180 can change a current main menu into a main menu existing at a touch point of the first pointer 10. And, the controller 180 can display at least one or more sub menus depending on the changed main menu in the vicinity of a touch point of a second pointer 20. In particular, a main menu can be changed and selected using a tap gesture.

Meanwhile, as shown in FIG. 38(b), although a touch of a second pointer 20 is released, a first pointer 10 can change and select a main menu via a tap gesture.

Meanwhile, as shown in FIGS. 37(A) to 37(C) and FIGS. 38(A) to (B), a menu selected by the first pointer 10 and the second pointer 20 can be displayed in a manner of being visually identified.

FIGS. 39(A) to (B) and FIGS. 40(A) to (B) are diagrams for explaining a sub menu changing process according to the present invention. Prior to explaining FIGS. 39(A) to (B) and FIGS. 40(A) to (B), assume that at least one or more main menus and at least one or more sub menus are displayed on a mobile terminal.

If a user input changing a touch point of a second pointer 20 is received on the screen, the controller 180 selects a sub menu existing at the touch point of the second pointer 20 and can display the sub menu.

Figure 40A:
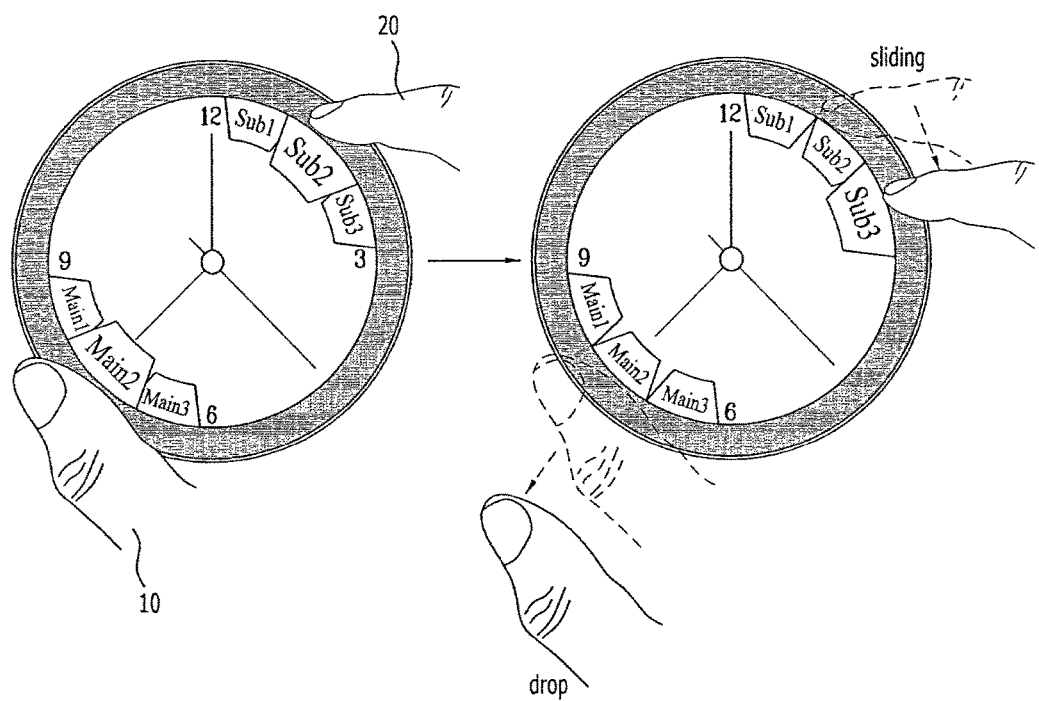

Referring to FIG. 40(A), if a user input of the second pointer 20 sliding according to a border line of the screen is received, the controller 180 can change a current sub menu into a sub menu existing at a touch point of the second pointer 20. In particular, a sub menu can be changed and selected using a slide gesture.

Figure 40B:
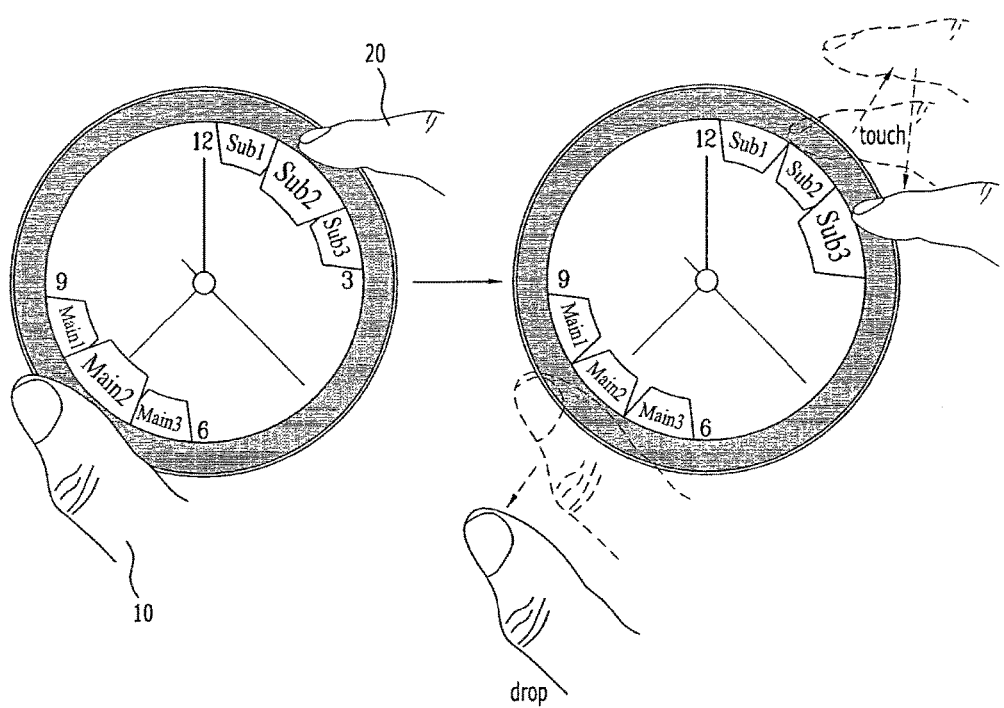

As shown in FIG. 40(B), if the second pointer 20 touching the screen is released and touches the screen again, the controller 180 can change a current sub menu into a sub menu existing at a touch point of the second pointer 20. In particular, a sub menu can be changed and selected using a tap gesture.

Meanwhile, as shown in FIG. 40(A), although a touch of a first pointer 10 is released, if a user input of a second pointer 20 sliding according to a touch input unit is received, a mobile terminal can change a sub menu into a sub menu corresponding to a touch point of the second pointer 20.

As shown in FIG. 40(B), although a touch of a first pointer 10 is released, after a second pointer 20 touching a touch input unit is released, if a user input of the second pointer 20 touching the touch input unit again is received, a mobile terminal can change a sub menu into a sub menu corresponding to a touch point of the second pointer 20. In particular, the mobile terminal can change and select a sub menu in response to a user input changing a position of the second pointer 20 irrespective of whether the first pointer 10 maintains a touch.

Meanwhile, as mentioned in the foregoing description, in case of FIGS. 39(A) to (B) and FIGS. 40(A) to (B), a menu selected by the first pointer 10 and the second pointer 20 can be displayed in a manner of being visually identified.

Figure 41:
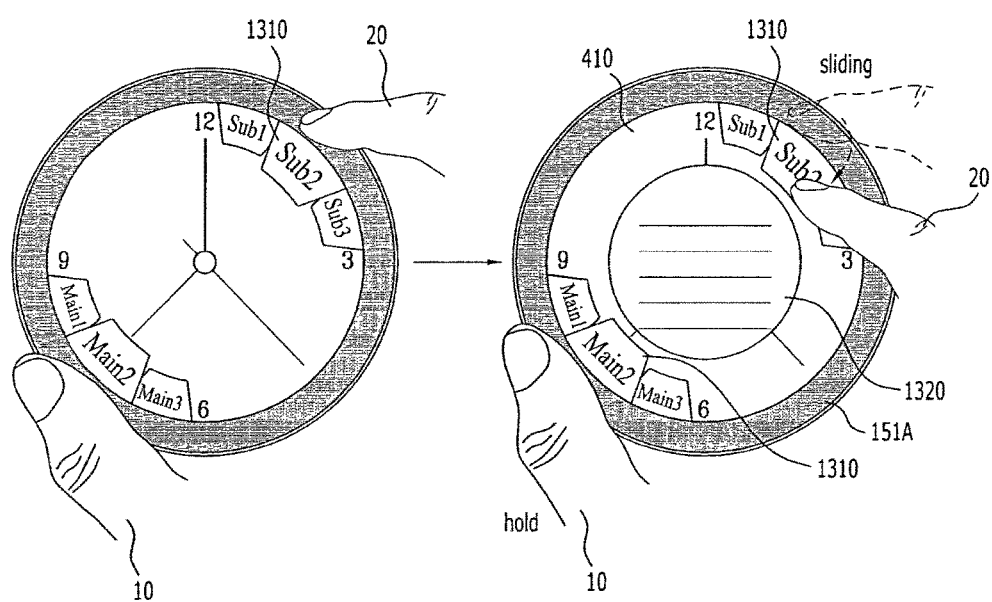

Subsequently, FIG. 41 is a diagram for explaining a command performing process according to the present invention.

If a user input for executing a sub menu selected by a second pointer 20 is received, the controller 180 can execute a command corresponding to the selected sub menu.

In particular, referring to FIG. 41, if a user input making the second pointer 20 slide toward the inside of the screen from a touch input unit 151A is received, the controller 180 can execute a pop-up command 1320 corresponding to the selected sub menu 1310.

Meanwhile, if the second pointer 20 touching the touch input unit 151A is released and a user input of the second pointer 20 touching the sub menu 1310 is received, the controller 180 can also execute the command 1320 corresponding to the sub menu 1310. In particular, if a user input tapping a sub menu displayed on a touch screen or a user input sliding the sub menu is received, a mobile terminal can execute a command corresponding to the selected sub menu.

Figure 42A:
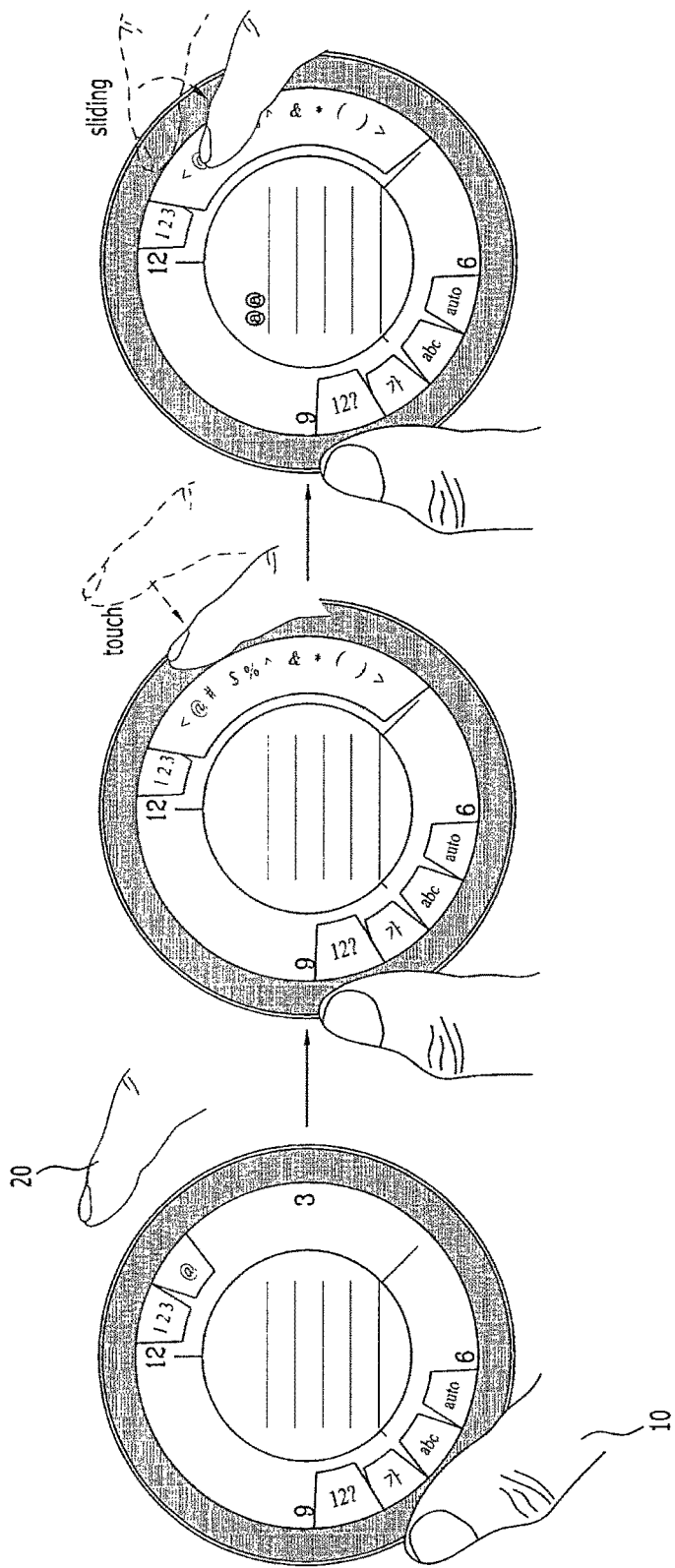
Figure 42B:
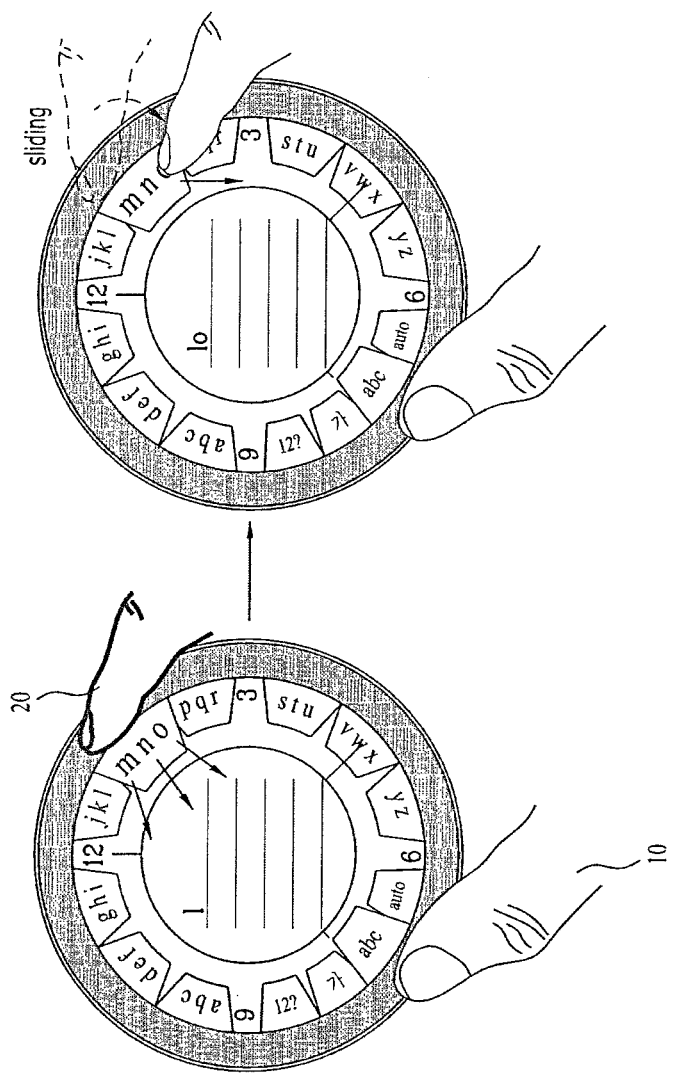
Figure 42C:
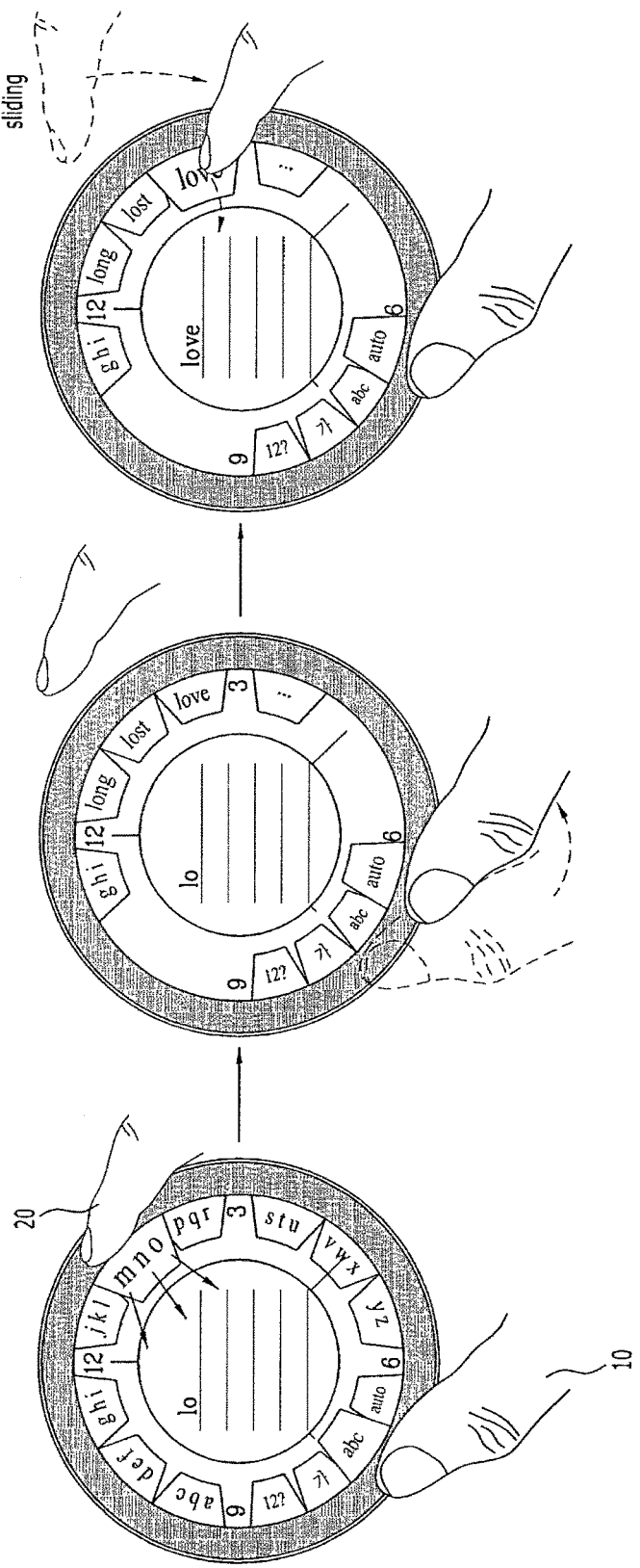

FIGS. 42(A) to (C) are diagrams for explaining a character inputting process according to the present invention. In this case, the character inputting process corresponds to one embodiment of a command execution mentioned earlier in FIG. 41.

Referring to FIG. 42(A), if a user input of a first pointer 10 selecting a character input menu is received, the controller 180 can display at least one or more sub menus indicating characters to be inputted.

Subsequently, if a user input of a second pointer 20 selecting one of the at least one or more sub menus is received, the controller 180 can activate (or enlarge) the selected sub menu.

Subsequently, if a user input of the second pointer 20 for executing the selected sub menu is received, the controller 180 can execute a command configured to input a character indicated by the selected sub menu. In this case, it is able to know that the user input for executing the selected sub menu corresponds to a user input making the second pointer 20 slide toward the inside of the screen from the touch input unit 151A.

Or, as shown in FIG. 42(B), if a sub menu selected by the second pointer 20 indicates a plurality of characters, the controller 180 can execute a command configured to input one (o) of a plurality of the characters (m, n and o) based on a sliding moving direction of the second pointer 20.

Meanwhile, as a character inputting process according to the present invention, there exists a character inputting process capable of inputting a completed text all at once.

Referring to FIG. 42(C), characters ('lo') are inputted on a mobile terminal. If a user input of a first pointer 10 changing a menu into a character completion menu ("auto") is received, the controller 180 can display sub menus indicating texts ("low", "long", "lost" and "love") capable of being completed using the previously inputted characters ("to").

If a user input of a second pointer 20 for executing a sub menu ("love") is received, the controller 180 can execute a command configured to input a text indicated by the sub menu ("love").

In this case, texts capable of being completed using a previously inputted character may be stored in a memory 170.

By using the character completion menu, a user is able to input a completed text all at once without inputting characters one by one.

Figure 43A:
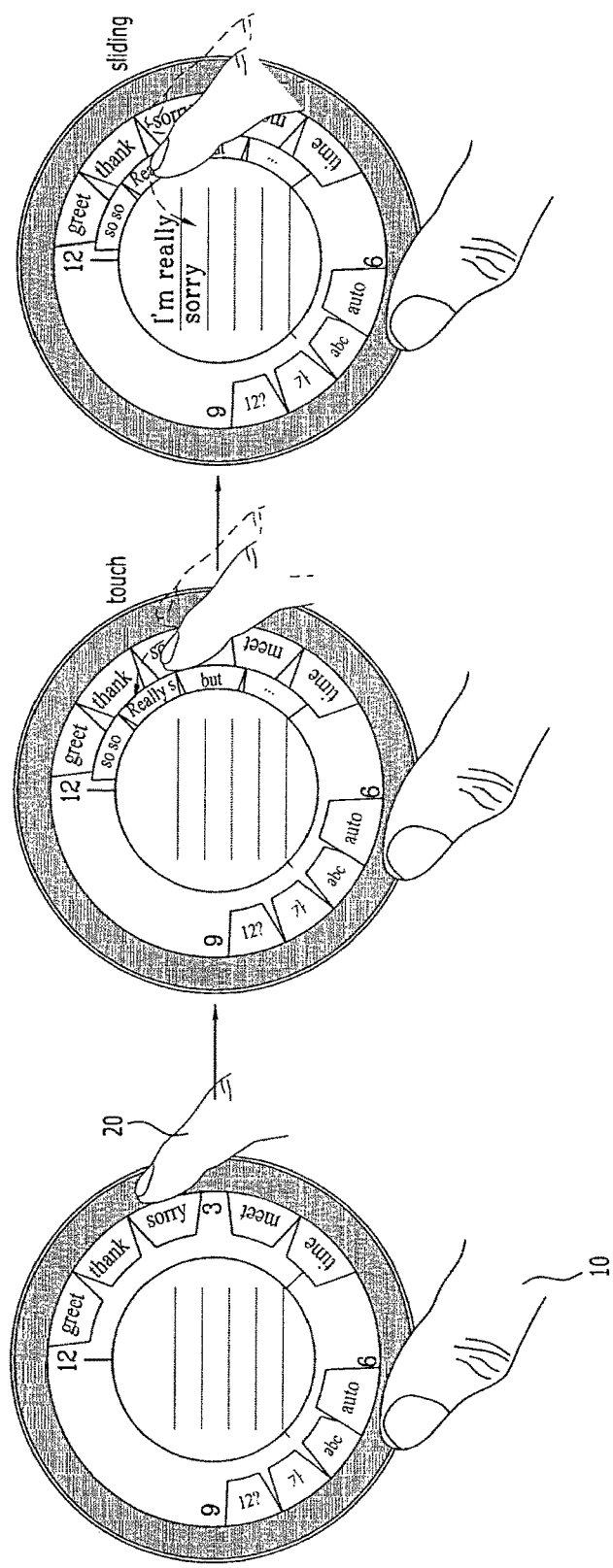
Figure 43B:
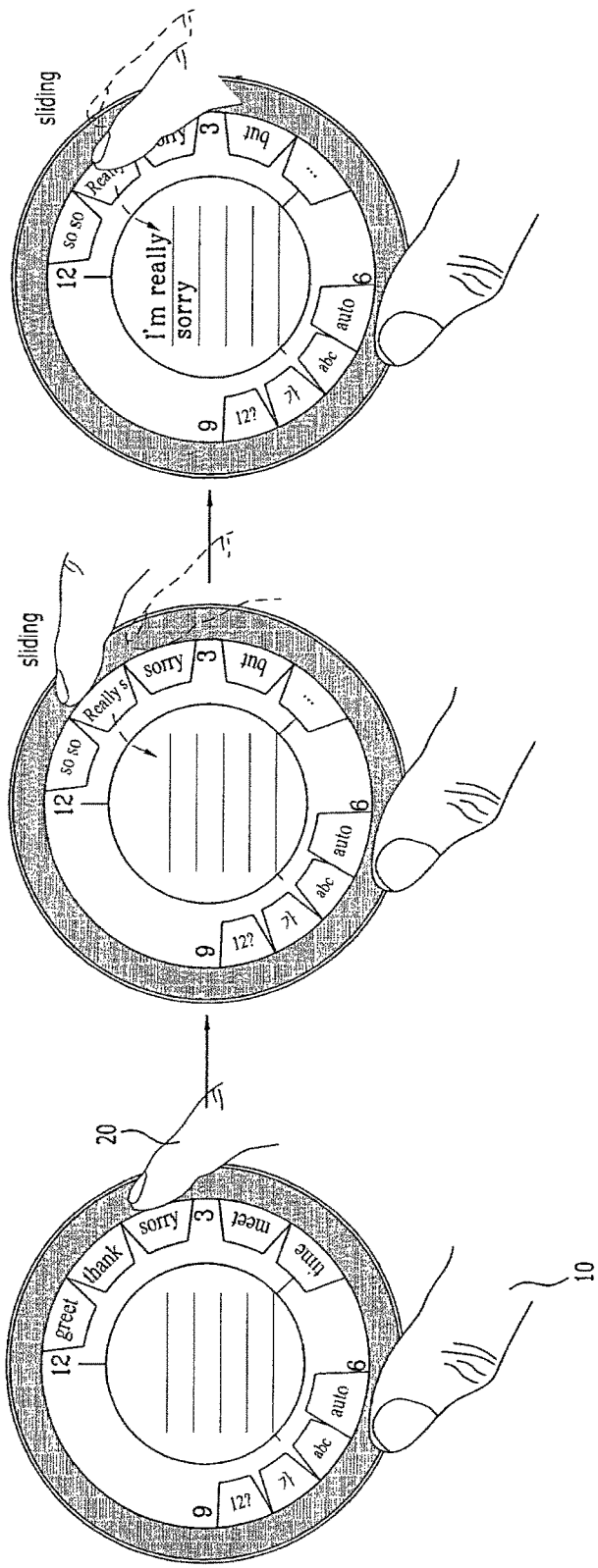

FIG. 43(A) and FIG. 43(B) are diagrams for explaining an automatic sentence inputting process according to the present invention.

Referring to FIG. 43(A), if a user input of a first pointer 10 changing a menu into a character completion menu ("auto") is received, the controller 180 can display sub menus indicating a predetermined sentence group ("greet", "thank", "sorry", "meet" and "time"). In this case, the predetermined sentence group corresponds to sentences frequently used by a user. The predetermined sentence group can be changed by a manufacturer or a user.

If a user input of a second pointer 20 selecting a sub menu ("sorry") is received on a touch screen, the controller 180 can display additional sub menus indicating sentences ("so sorry", "I'm really sorry" and "sorry but") capable of being completed by including a text indicated by the selected sub menu ("sorry"). In this case, the additional sub menus can be separately displayed on the inside of the sub menu.

If a user input of the second pointer 20 selecting an additional sub menu ("I'm really sorry") is received on the touch screen, the controller 180 can execute a command configured to input a sentence indicated by the additional sub menu ("I'm really sorry").

In this case, a user input of the second point 20 selecting a sub menu and an additional sub menu can be inputted at a time by a sliding movement.

Meanwhile, as shown in FIG. 43(B), if a user input of the second pointer 20 selecting a sub menu ("sorry") is received (on the touch screen or the touch input unit), the controller 180 can display additional sub menus indicating text messages ("sorry", "I'm really sorry" and "sorry but") capable of being completed by including a text indicated by the selected sub menu ("sorry"). In this case, different sub menus ("greet", "think", "meet" and "time") except the selected sub menu ("sorry") are changed to additional sub menus ("sorry", "I'm really sorry" and "sorry but") and can be displayed as the additional sub menus.

If a user input of the second pointer 20 selecting an additional sub menu ("I'm really sorry") is received on the touch screen, the controller 180 can execute a command configured to input a sentence indicated by the additional sub menu ("I'm really sorry").

In this case, a user input of the second point 20 selecting a sub menu and an additional sub menu can be inputted at a time by a sliding movement.

Referring to FIG. 43(A), additional sub menus are displayed on a separated position. On the other hand, referring to FIG. 43(B), additional sub menus are displayed on a position of sub menus in a manner of replacing the sub menus with the additional sub menus.

Meanwhile, a frequently used sentence group may be stored in a memory 170. By using the aforementioned automatic sentence input menu, a user is able to easily input a completed sentence without inputting characters one by one. Regarding this, it shall be explained in detail with reference to FIG. 48.

Figure 44A:
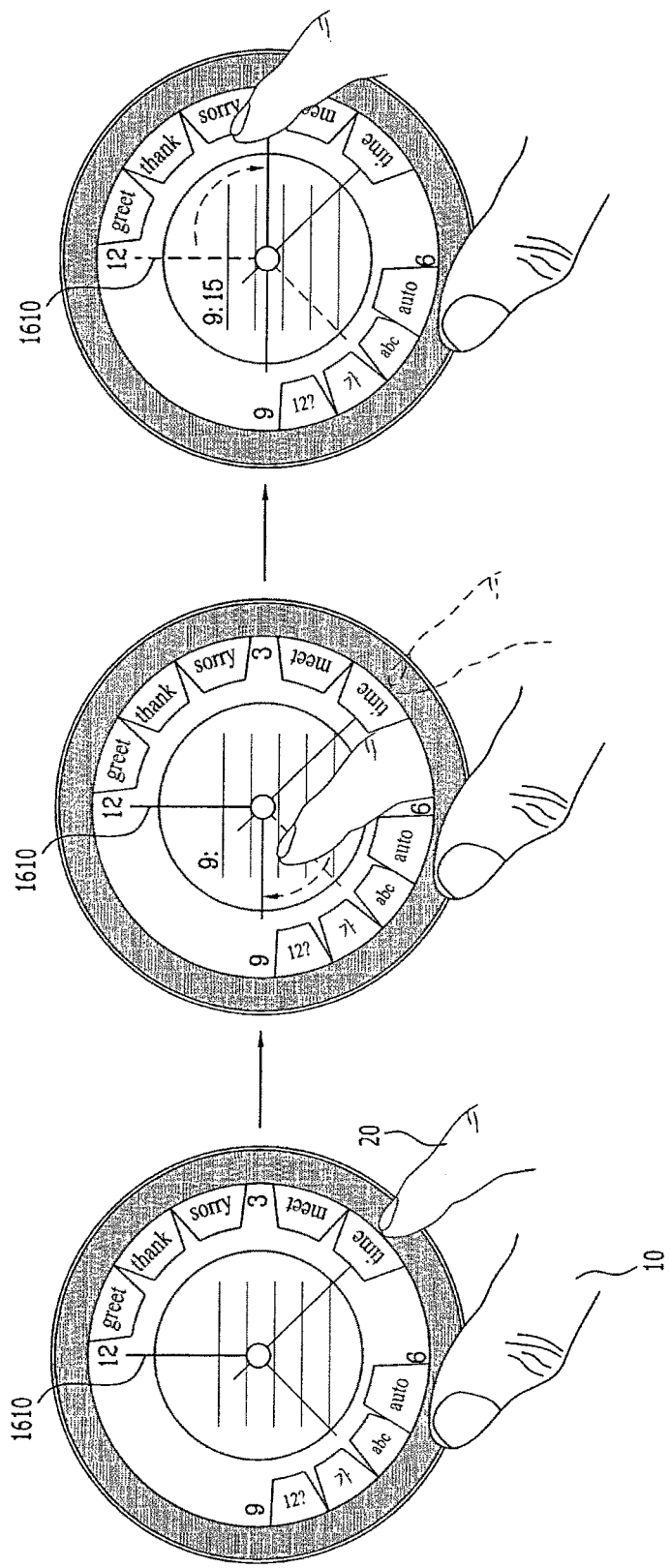
Figure 44B:
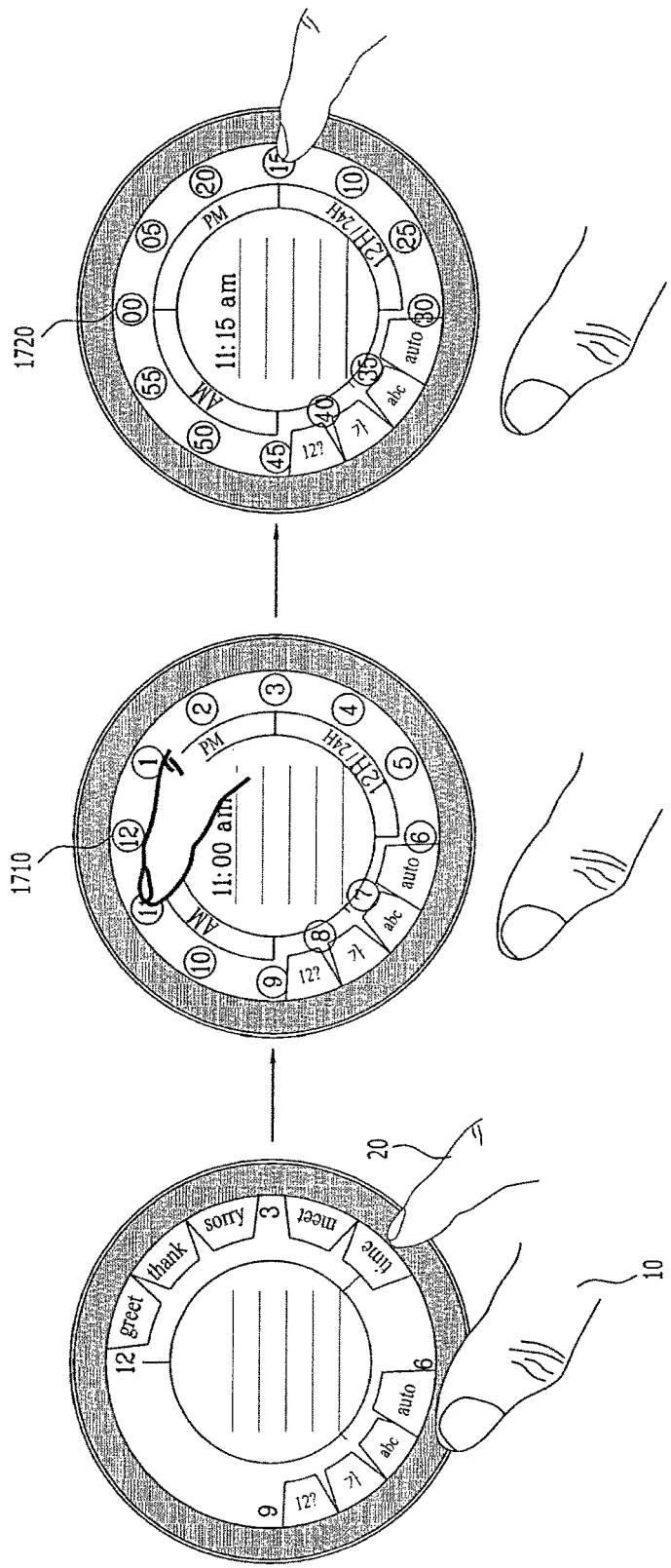

FIG. 44(A) and FIG. 44(B) are diagrams for explaining a time data character inputting process according to the present invention.

Referring to FIG. 44(A), if a user input of a second pointer 20 selecting a time menu ("time"), which is one of sub menus of a character completion menu ("auto"), is received, the controller 180 can display a watch UI (user interface) 1610. In this case, the watch UI 1610 may correspond to a UI of a form including an hour hand and a minute hand of an analog type. If a user input of the second pointer 20 operating the watch UI 1610 is received, the controller 180 can execute a command configured to input time data indicated by the operated watch UI 1610 as characters. In particular, as shown in FIG. 44(A), if a user input operates the hour hand to show '9 o'clock' and operates the minute hand to show '15 minutes', a mobile terminal can input such time data as "9:15" as characters.

Meanwhile, as shown in FIG. 44(B), a watch UI 1710 may correspond to a UI of a digital type. Referring to FIG. 44(B), if a user input of a second pointer 20 selecting a time menu ("time"), which is one of sub menus of a character completion menu ("auto"), is received, the controller 180 can display the watch UI (user interface) 1710.

In this case, the controller 180 firstly displays the watch UI 1710 capable of receiving an input of 'time' and may be then able to display a watch UI 1720 capable of receiving an input of 'minute' after the input of 'time' is received.

As shown in FIG. 44(B), if a user input selecting 'AM 11 o'clock' is received, the controller 180 inputs time data such as "11:00 AM" as characters and may be then able to display the watch UI capable of receiving an input of 'minute'. Subsequently, if a user input selecting '15 minutes' is received, the controller 180 can input time data such as "11:15 AM" as characters.

The controller 180 can provide a user with an intuitive and emotional time character inputting method such as FIGS. 16(A) and 13(B).

Subsequently, if a user input of the first pointer 10 selecting a character menu is received, the controller 180 can display at least one or more sub menus indicating characters. If a user input for rolling the sub menus is received on a touch input unit 151A and then a double touching user input is received, the controller 180 can execute a command configured to input a character indicated by a sub menu corresponding to a predetermined position of a touch screen.

Figure 45:
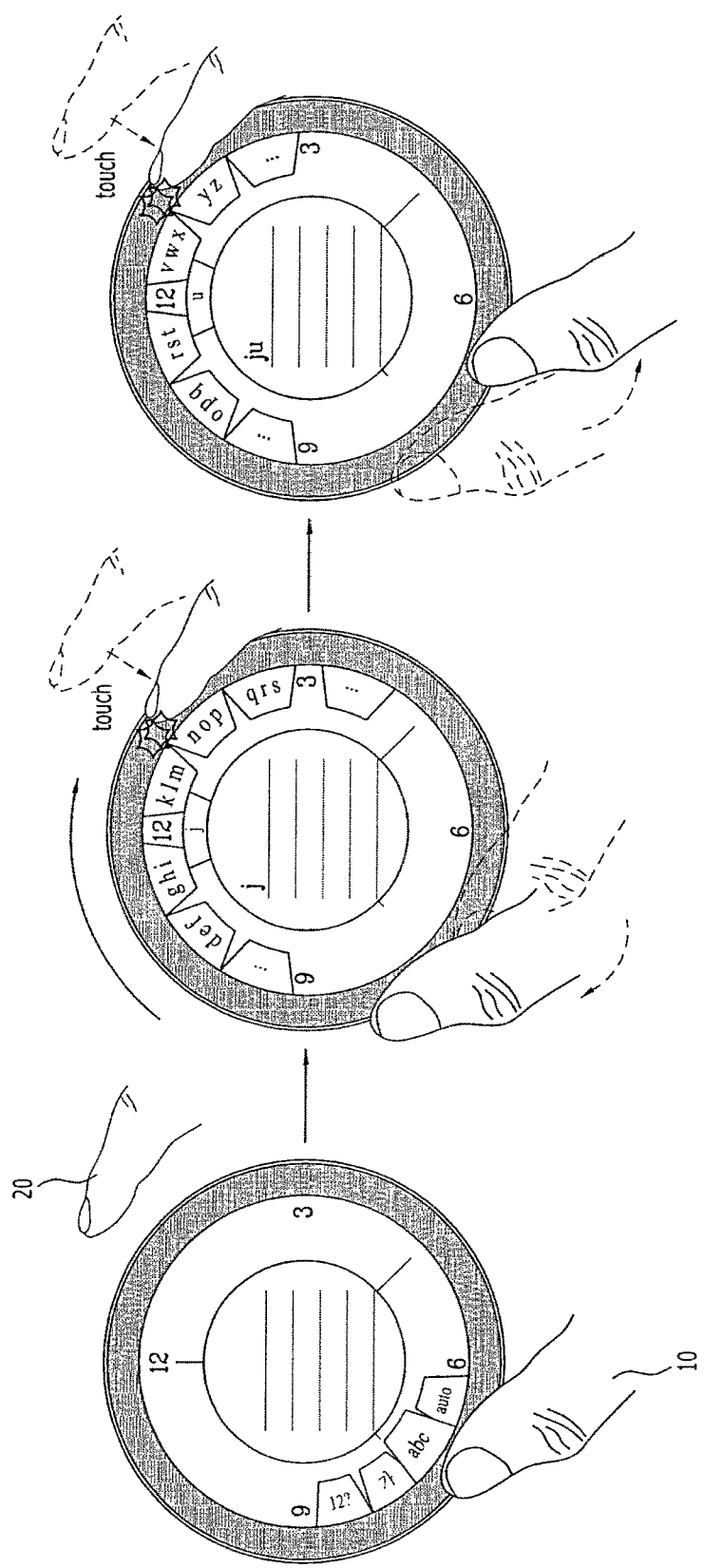

As shown in FIG. 45, if a user input of the first pointer 10 selecting a character menu ("abc") from main menus is received, the controller 180 can display sub menus indicating alphabet characters, respectively. If a user input of the first pointer 10 rolling the sub menus is received on the touch input unit 151A, the sub menus are rolled in response to an operation of the first pointer 10 and an alphabet character indicated by a sub menu, which is positioned at a top center (12 o'clock) of the screen, can be activated. If a user input of the second pointer 20 double touching (or double tapping) the touch input unit 151A is received, the controller 180 can input the activated alphabet character.

Figure 46B:
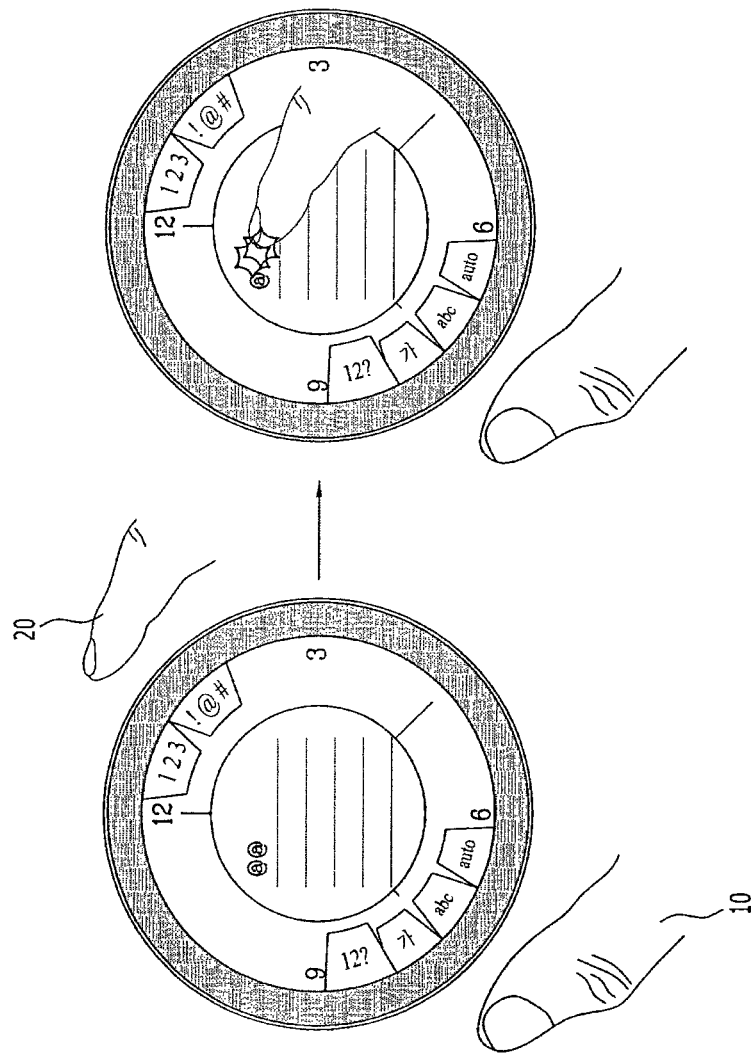

FIG. 46(A) and FIG. 46(B) are diagrams for explaining a process of deleting an inputted character according to the present invention. Prior to explaining FIG. 46(A) and FIG. 46(B), assume that characters are inputted on a mobile terminal.

Referring to FIG. 46(A), if a user input sliding a character displayed on a touch screen toward a touch input unit from the touch screen is received, the controller 180 can perform a command configured to delete the displayed character.

Or, as shown in FIG. 46(B), if a user input double clicking a character displayed on a touch screen is received, the controller 180 can perform a command configured to delete the displayed character.

Figure 47:
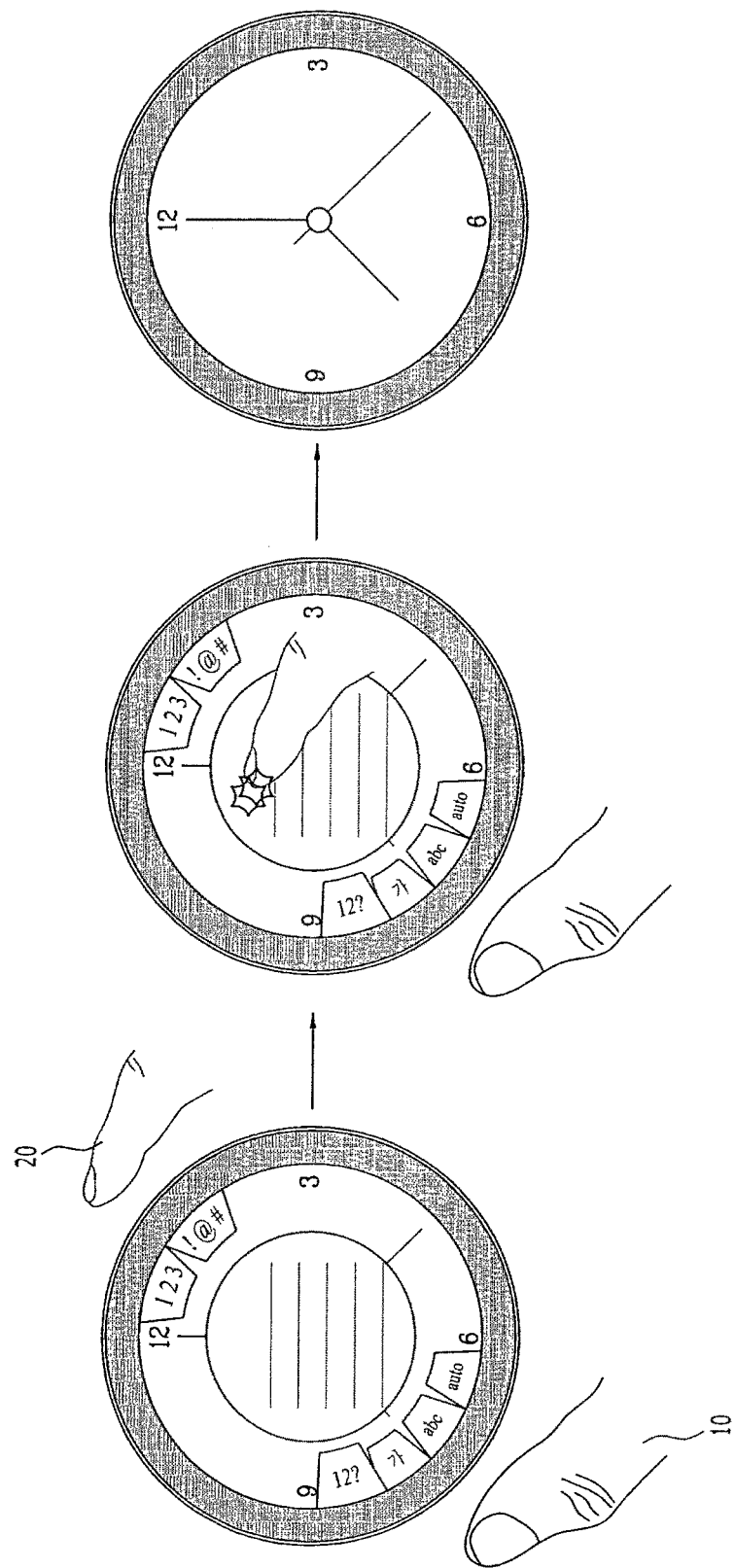

FIG. 47 is a diagram for explaining a menu display terminating process according to the present invention.

Referring to FIG. 47, if a user input double clicking a touch screen is received, the controller 180 can execute a command configured to terminate a displayed main menu, a displayed sub menu and an application in use.

Besides a user input double tapping the touch screen shown in FIG. 47, the aforementioned termination command can be executed by a user input lightly pushing a physical button (e.g., a power button) mounted on a mobile terminal.

FIG. 48 is a diagram of a sub menu configuration list for an automatic sentence inputting process according to the present invention.

As mentioned earlier in FIG. 43(A) and FIG. 43(B), in order to perform the automatic sentence inputting process according to the present invention, it may store a list of sentence groups shown in FIG. 48.

Although sub menus of level 1 (sub menus) and sub menus of level 2 (additional sub menus) are limitedly explained in FIG. 43(A) and FIG. 43(B), the automatic sentence inputting process can be used for sub menus of level 3 and sub menus of a level lower than the level 3 as well.

Figure 49:
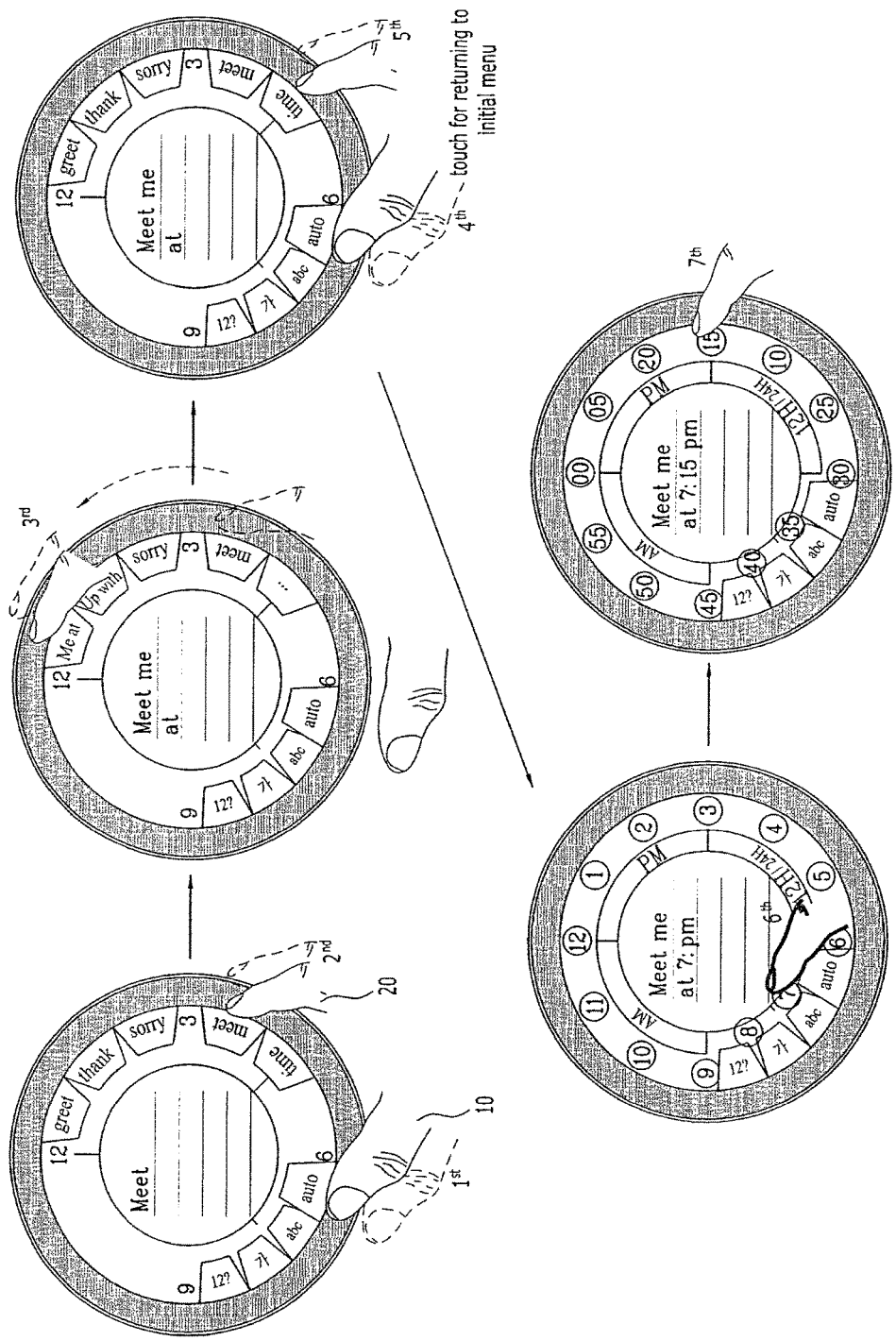

FIG. 49 is a diagram for a character input scenario according to the present invention.

As shown in FIG. 49, a user can operate a mobile terminal to input a sentence such as "Meet me at 7:15 pm".

1) a user selects a character completion menu ("auto") from main menus using a first pointer 10 and 2) selects a sub menu indicating "Meet" from sub menus depending on the character completion menu using a second pointer 20. According the aforementioned user inputs, a controller 180 inputs "Meet" and displays at least one or more additional sub menus.

The at least one or more additional sub menus include a menu indicating sentences ("Meet me at" and "Meet up with") capable of being completed by including a text indicated by the selected sub menu ("Meet").

Subsequently, 3) the user selects an additional sub menu indicating "Meet me at" from the additional sub menus using the second pointer 20. The controller 180 can input "Meet me at" in response to the user input.

Subsequently, 4) the user selects the character completion menu ("auto") again from the main menus to return to the initial sub menu using the first pointer 10 and 5) selects a time menu ("time") from the sub menus depending on the character completion menu using the second pointer 20. The controller 180 can display a watch UI in response to the user input.

Subsequently, 6) the user selects "7 o'clock" from the watch UI using the second pointer 20 and 7) selects "15 minutes". The controller 180 can input "Meet me at 7:15 pm" in response to the user input.

As mentioned in the foregoing description, according to a mobile terminal and a method of controlling therefor according to the present invention, the mobile terminal can be controlled in a touch screen of a small size in accordance with an intuitive and convenient user input method.

And, a mobile terminal according to the present invention is able to input a text using a minimized user input compared to a touch input using a legacy touch screen.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a touch screen configured to display information on a screen having a wheel shape; and
a controller operably coupled to the touch screen, wherein the controller is configured to:
control two or more touch keys displayed on a border of the screen, the touch keys are respectively arranged according to the border in the wheel shape, and each touch key to correspond to at least one or more characters different from each other, and
in response to receiving a first touch input on at least one touch key, control an operation assigned to at least one or more characters corresponding to the at least one touch key,
wherein the controller is further configured to:
when a first touch key and a second touch key are touched from among the two or more touch keys and the first and second touch keys are firstly dragged, greater than a first distance, toward a center of the screen as the first touch input, control the touch screen to display the first and second touch keys by expanding the first touch key and the second touch key from an original location of the first touch key and the second touch key toward the center of the screen,
when the expanded first and second touch keys are secondly dragged, more than a second distance, toward the center of the screen while the first and second touch keys are expanded and a touch of the first and second touch keys are maintained, search for at least one multimedia file having a name including a plurality of characters assigned to the first and second touch keys, and
control the touch screen to display a list of the searched at least one multimedia file, wherein the list is displayed between the original location of the first and second touch keys and a location where the first and second touch keys are secondly dragged toward the center of the screen.

2. The mobile terminal of claim 1, wherein:
the at least one touch key includes both a displayed representative character and two or more displayed characters having a number adjacent to the representative character, and
the representative character is displayed to be larger than the two or more characters.

3. The mobile terminal of claim 1, wherein:
the first touch input includes a touch scheme for touching and releasing a first touch key, and
wherein in response to receiving the first touch input, the controller is further configured to provide a first character to be inputted, from among at least one or more characters assigned to the first touch key.

4. The mobile terminal of claim 3, wherein:
the first touch input includes at least one of a first touch scheme for touching the first touch key, dragging the first touch key in a first direction while the first touch key is touched, and for releasing the first touch key, and a second touch scheme for touching the first touch key, dragging the first touch key in a second direction opposite to the first direction while the first touch key is touched, and for releasing the first touch key,
wherein when a touch input corresponding to the first touch scheme is received, the controller is further configured to provide a second character to be inputted, from among the at least one or more characters corresponding to the first touch key, and
wherein when a touch input corresponding to the second touch scheme is received, the controller is further configured to provide a third character to be inputted, from among the at least one or more characters corresponding to the first touch key.

5. The mobile terminal of claim 1, wherein the controller is further configured to:
control the touchscreen to display a specific text in the screen, and
when a drag touch is provided on the touch keys arranged in the wheel shape, gradually and automatically select characters in the text in response to a drag distance of the drag touch.

6. The mobile terminal of claim 1, wherein in response to a first side of the screen being touched and dragged to a second side of the screen facing the first side, the controller is further configured to control the touch screen to display a handwriting input area on the screen.

7. The mobile terminal of claim 1, further comprising:
a microphone, and
wherein in response to a first side of the screen being touched and dragged to a second side of the screen facing the first side, the controller is further configured to provide a voice recognition function via the microphone.

8. The mobile terminal of claim 1, wherein in response to a first side of the screen being touched and dragged to a second side of the screen facing the first side, the controller is further configured to control the touch screen to display an area of the screen having at least one or more copied texts.

9. The mobile terminal of claim 1, wherein in response to receiving a second touch input by touching a first and a second point of the screen by a first and a second pointer, respectively, the controller is further configured to control the touch screen to display at least one or more main menus in a vicinity of the first point and display at least one or more sub menus, based on a main menu selected from the at least one or more main menus, in a vicinity of the second point.

10. The mobile terminal of claim 9, wherein when a touch point of the first pointer touching the first point changes, the controller is further configured to control the touch screen to display at least one or more sub menus, based on a main menu corresponding to the changed touch point, in the vicinity of the second point.

11. The mobile terminal of claim 9, wherein when a sub menu touched by the second pointer is dragged toward an inside of the screen, the controller is further configured to execute a command corresponding to the sub menu.

12. The mobile terminal of claim 9, wherein:
a main menu selected by the first pointer includes a character input menu,
the controller is further configured to control the touch screen to display at least one or more sub menus to which a character corresponds in the vicinity of the second point, and
when one of the at least one or more sub menus is touched by the second pointer and is dragged toward the inside of the screen, the controller is further configured to provide a character to be inputted corresponding to the dragged sub menu.

13. The mobile terminal of claim 12, wherein:
when a main menu selected by the first pointer changes to a character completion menu, the controller is further configured to control at least one or more sub menus to which a text capable of being completed by containing a pre-written character is assigned to be displayed in the vicinity of a touch point of the second pointer and control at least one or more additional sub menus depending on a sub menu to which the text is assigned to be displayed, and at least one or more sentences capable of being completed by containing a text assigned to the selected sub menu are assigned to the at least one or more additional sub menus.

14. The mobile terminal of claim 12, wherein:

the sub menu touched by the second pointer includes a time menu, the controller is further configured to control a watch user interface (UI) to be displayed on the screen, and when a user input of the second pointer operating the watch UI is received, the controller is further configured to control a time data to be provided as a character.

15. The mobile terminal of claim 12, wherein when a character displayed on the screen is dragged toward an outside of the screen, the controller is further configured to delete the character.

16. The mobile terminal of claim 9, wherein:

when a main menu selected by the first pointer corresponds to a character menu, the controller is further configured to control at least one or more sub menus indicating a character to be displayed, and in response to a user input rolling a sub menu and a double touch user input, the controller is further configured to control a character indicated by a sub menu corresponding to a predetermined position of the screen to be inputted.

17. A method of controlling a mobile terminal, the method comprising:

displaying two or more touch keys arranged on a border of a screen having a wheel shape, the touch keys are respectively arranged according to the border in the wheel shape and each touch key being respectively assigned one or more characters different from each other;

when a first touch key and a second touch key are touched from among the two or more touch keys and the first and second touch keys are firstly dragged more than a first distance toward a center of the screen as the first touch input, displaying the first and second touch keys by expanding the first touch key and the second touch key from an original location of the first touch key and the second touch key toward the center of the screen;

when the expanded first and second touch keys are secondly dragged more than a second distance toward the center of the screen more than a second distance while the first and second touch keys are expanded and a touch of the first and second touch keys are maintained, searching for at least one multimedia file having a name including a plurality of characters assigned to the first and second touch keys; and displaying a list of the searched at least one multimedia file, wherein the list is displayed between the original location of the first and second touch keys and a location where the first and second touch keys are secondly dragged toward the center of the screen.

* * * * *